US011740353B2

(12) United States Patent
Waldron et al.

(10) Patent No.: US 11,740,353 B2
(45) Date of Patent: Aug. 29, 2023

(54) SYSTEMS, METHODS, AND APPARATUSES FOR ALERTING USERS TO MAINTAIN PHYSICAL DISTANCING

(71) Applicant: Hand Held Products, Inc., Fort Mill, SC (US)

(72) Inventors: John F. Waldron, Charlotte, NC (US); Marinedrive Piskaladhanabalan, Charlotte, NC (US); Manjul Bizoara, Charlotte, NC (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 395 days.

(21) Appl. No.: 16/992,626

(22) Filed: Aug. 13, 2020

(65) Prior Publication Data

US 2022/0050199 A1    Feb. 17, 2022

(51) Int. Cl.
*G01S 17/08* (2006.01)
*H04W 4/80* (2018.01)
(Continued)

(52) U.S. Cl.
CPC .............. *G01S 17/08* (2013.01); *G06F 18/22* (2023.01); *G06N 3/02* (2013.01); *H04W 4/80* (2018.02)

(58) Field of Classification Search
CPC ....... G01S 17/08; H04W 4/80; G06K 9/6215; G06N 3/02
(Continued)

(56) References Cited

U.S. PATENT DOCUMENTS 10,126,406 B2 *  11/2018  Altman ................. G01S 15/523
11,476,006 B2 *  10/2022  Chatterjea ............. G16H 50/80
(Continued)

FOREIGN PATENT DOCUMENTS

DE          3806849 A1    9/1989
WO     2016/126410 A1    8/2016

OTHER PUBLICATIONS

Carullo, A., et al., Ultrasonic Distance Sensor Improvement Using a Two-Level Neural-Network , May 1996, [online], [retrieved from the Internet Nov. 11, 2020],<URL:https://www.researchgate.net/publication/3088741_Ultrasonic_distance_sensor_improvement_using_a_two-level_neural-network> (7 pages).
(Continued)

*Primary Examiner* — Aditya S Bhat
(74) *Attorney, Agent, or Firm* — Alston & Bird LLP

(57) ABSTRACT

A method for alerting a user on an electronic device is described. The method includes identifying a signal at an ultrasound transmission frequency received at a first electronic device from a second electronic device. Further, the method includes receiving timing information corresponding to an exchange of an ultrasound transmission between the first electronic device and the second electronic device. Furthermore, a first distance value between the first electronic device and the second electronic device is computed by performing a time of flight estimation using the timing information. Furthermore, the first distance value is refined by using an output of a machine learning model to determine a second distance value. Furthermore, the method includes generating an alert based on the comparison of the second distance value with a predefined threshold distance value. In some examples, the alert can be indicative of a violation of a physical distancing norm in an environment.

20 Claims, 11 Drawing Sheets

(51) Int. Cl.
*G06N 3/02* (2006.01)
*G06F 18/22* (2023.01)

(58) Field of Classification Search
USPC .......................................................... 702/159
See application file for complete search history.

(56) References Cited

U.S. PATENT DOCUMENTS

| | | | |
|---|---|---|---|
| 2009/0268553 A1 | 10/2009 | Ecker et al. | |
| 2016/0291116 A1 | 10/2016 | Horie et al. | |
| 2020/0079412 A1* | 3/2020 | Ramanathan | ........ G06Q 20/202 |
| 2021/0072378 A1* | 3/2021 | Shin | ........ G01S 15/88 |

OTHER PUBLICATIONS

Chandler, Simon, "New Ultrasonic Contact-Tracing App Promises Better Accuracy Than Bluetooth Alternatives", May 26, 2020, [online], [retrieved from the Internet Nov. 11, 2020], <URL: https://www.forbes.com/sites/simonchandler/2020/05/26/new-ultrasonic-contact-tracing-app-promises-better-accuracy-than-bluetooth-alternatives/?sh=302c38032122> (5 pages).

Marioli, D., et al., "Ultrasonic Distance Measurement for Linear and Angular Position Control", IEEE Transactions on Instrumentation and Measurement, Dec. 1988, vol. 37, No. 4, pp. 578-581.

Moko Smart, "BLE Wristband Beacon & LoRaWAN Wearables in Covid-19 Contact Tracing Solution", [retrieved from the Internet Nov. 11, 2020] <URL: https://www.mokosmart.com/lorawan-ble-wearable-wristband-beacon-covid-19-contact-tracing-solution/?gclid=EAIalQobChMIjOrjtlrW6QIVxBwrCh2eEQfREAAYASAAEgLJkvD_BwE> (16 pages).

Payne, Emily, "CMU Professor Creates Innovative App to Anonymously Trace Exposure to COVID-19", Apr. 17, 2020, [online], [retreived from the Internet Nov. 19, 2020], <URL: https://www.cmu.edu/news/stories/archives/2020/april/app-anonymously-traces-covid19.html> (4 pages).

Extended European search report dated Feb. 14, 2022 for EP Application No. 21189736, 13 pages.

* cited by examiner

SYSTEMS, METHODS, AND APPARATUSES FOR ALERTING USERS TO MAINTAIN PHYSICAL DISTANCING

TECHNOLOGICAL FIELD

Example embodiments described herein relate generally to systems, methods, and apparatuses for determining a distance between two users in an environment, and, more particularly, to alerting users to maintain physical distancing.

BACKGROUND

Electronic devices such as, but not limited to, mobile devices, smartphones, laptops, handheld devices, portable data terminals, barcode scanners, RFID readers, imagers, and/or the like, are commonly used by users for performing various activities. In some situations, it may be desired to notify, on an electronic device, of a user about a presence or an availability of another user within his or her vicinity. For instance, in some examples, a user may be notified on the electronic device for events such as, but not limited to, a presence of another user within a close proximity, another user approaching towards the user, and/or based on a distance of the user with another user. In another examples, the user may be notified on the electronic devices for a violation of a social distancing norm to be maintained between individuals, safety tips, and/or the like. In some examples, such notifications can be generated based on determination of a distance between two users. As calculation of the distance between two users can be influenced by various external factors, performing an accurate estimation of the distance between the two users is challenging and has associated limitations.

SUMMARY

The following presents a simplified summary to provide a basic understanding of some aspects of embodiments described herein. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a method for alerting a user on an electronic device. The method includes identifying, by a first microphone of a first electronic device, a signal at an ultrasound transmission frequency. The signal can be received from a second electronic device. Further, the method includes receiving, at the first electronic device, timing information corresponding to an exchange of an ultrasound transmission between the first electronic device and the second electronic device. Furthermore, the method includes computing, by a processing unit of the first electronic device, a first distance value between the first electronic device and the second electronic device by performing a time of flight estimation using the timing information. Furthermore, the method includes refining, by the processing unit, the first distance value by using an output of a machine learning model. The first distance value can be refined so as to determine a second distance value. Further, the machine learning model can be based on input data comprising: the first distance value and a set of distance values that are each associated with at least one respective predefined factor that affects an estimation of distance between the first electronic device and the second electronic device. Furthermore, the method includes generating, by the processing unit, an alert on the first electronic device based on the comparison of the second distance value with a predefined threshold distance value.

In some example embodiments, the at least one predefined factor can include a temperature of an environment in which at least one of the first electronic device and the second electronic device are present. In some example embodiments, the at least one predefined factor can include usage history of at least one of the first electronic device and the second electronic device. Further, in some example embodiments, the at least one predefined factor can include orientation data associated with at least one of the first electronic device and the second electronic device. Furthermore, in some example embodiments, the at least one predefined factor can include a device specification information associated with at least one of the first electronic device and the second electronic device. Furthermore, in some example embodiments, the at least one predefined factor can include movement data associated with at least one of the first electronic device and the second electronic device.

In some example embodiments, the alert generated by the processing unit can be indicative of a violation of a physical distancing guideline that is to be maintained between a first worker associated with the first electronic device and a second worker associated with the second electronic device in an environment.

According to some example embodiments, generating the alert can include at least one of: (a) ringing an alarm on the first electronic device, (b) displaying an indication on a first display screen of the first electronic device, where a color of the indication is based on the second distance value, (c) generating a haptic feedback on the first electronic device, and (d) activating a first flashlight of the first electronic device.

According to some example embodiments, the method includes broadcasting, by a first communication circuit of the first electronic device, a request for connection over a Bluetooth low energy (BLE) communication network. Further, in response to receiving of a response to the request for connection from the second electronic device, the method includes generating a first signal at a first ultrasound frequency by the first electronic device.

A system is described in accordance with some example embodiments. The system includes a processor and a memory that stores executable instructions that, when executed by the processor, facilitate performance of operations. The operations can include receiving a timing information corresponding to an exchange of an ultrasound frequency signal by a first electronic device and a second electronic device. Further, the operations can include computing a first distance value between the first electronic device and the second electronic device by performing a time of flight estimation using the timing information. Furthermore, the operations can include refining the first distance value by using an output of a machine learning model to determine a second distance value. In this regard, the machine learning model can be based on input data comprising: the first distance value and a set of distance values that are recorded according to at least one predefined factor that affect an estimation of distance between the first electronic device and the second electronic device. Furthermore, the operations can include generating an alert on at least one of, the first electronic device and the second electronic device, based on the comparison of the second distance value with a predefined threshold distance value.

In some example embodiments, the operations can further include generating a first command to cause ringing of an alarm on at least one of the first electronic device and the second electronic device. Further the operations can include, generating a second command to cause displaying of an indication on at least one of, a first display screen of the first electronic device and a second display screen of the second electronic device, wherein a color of the indication is based on the second distance value. Furthermore, the operations can include generating a third command to cause activation of at least one of, a first flashlight of the first electronic device and a second flashlight of the second electronic device. Furthermore, the operations can include generating a fourth command to cause generating of a haptic feedback on at least one of, the first electronic device and the second electronic device.

According to some example embodiments, the operations can further include receiving, from the first electronic device, (a) a first timing information indicative timing of broadcasting of a first signal at a first ultrasound frequency by a first speaker of the first electronic device and (b) a second timing information indicative of timing of receiving of a second signal at a second ultrasound frequency by a first microphone of the first electronic device. Further, the operations can include receiving, from the second electronic device, (c) a third timing information indicative timing of broadcasting of the second signal at the second ultrasound frequency by a second speaker of the second electronic device and (d) a fourth timing information indicative of timing of receiving of the first signal at the second ultrasound frequency by a second microphone of the second electronic device. Furthermore, the operations can include computing the first distance between the first electronic device and the second electronic device by performing the time of flight estimation based on the first timing information, the second timing information, the third timing information, and the fourth timing information.

A first electronic device is described in accordance with some example embodiments. The first electronic device includes a speaker that can be configured to generate a first signal at a predefined ultrasound frequency. Further, the first electronic device includes a microphone that can be configured to identify a second signal at the predefined ultrasound frequency. Furthermore, the first electronic device includes a communication circuitry that can be configured to transmit the first signal and receive the second signal. Furthermore, the first electronic device includes a processing unit. The processing unit can be communicatively coupled to the speaker, the microphone, and the communication circuitry. The processing unit can be configured to receive timing information corresponding to an exchange of an ultrasound transmission between the first electronic device and the second electronic device. Furthermore, the processing unit can be configured to compute a first distance value between the first electronic device and the second electronic device. The first distance value can be computed by performing a time of flight estimation using the timing information. Furthermore, the processing unit can be configured to refine the first distance value by using an output of a machine learning model. In this regard, the first distance value can be refined to a second distance value determined by the processing unit. In this aspect, the machine learning model can be based on input data comprising: the first distance value and a set of distance values that are each associated with at least one respective predefined factor that affects an estimation of distance between the first electronic device and the second electronic device. Furthermore, the processing unit of the first electronic device can be configured to generate an alert on the first electronic device based on the comparison of the second distance value with a predefined threshold distance value.

According to some example embodiments the processing unit of the first electronic device can be configured to generate the alert. In some examples, the alert can include ringing an alarm on the first electronic device. Further, the alert can include displaying an indication on a first display screen of the first electronic device. In this regard, in some examples, a color of the indication can be based on the second distance value. Furthermore, in some examples, the alert can include generating a haptic feedback on the first electronic device. In some examples, the alert can include activating a first flashlight of the first electronic device.

In some example embodiments, the communication circuitry of the first electronic device can be configured to broadcast a request for connection over a Bluetooth low energy (BLE) communication network. In this regard, in response to receiving of a response to the request for connection from the second electronic device, the processing unit can be configured to initiate transmission of the first signal.

According to some example embodiments, the processing unit can be configured to send a first command to ring an alarm on the second electronic device. Further, the processing unit can be configured to send a second command to display an indication on a second display screen of the second electronic device. In this regard, a color of the indication is based on the second distance value. Furthermore, the processing unit can be configured to send a third command to generate a haptic feedback on the second electronic device. Furthermore, the processing unit can be configured to send a fourth command to activate a second flashlight of the second electronic device.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
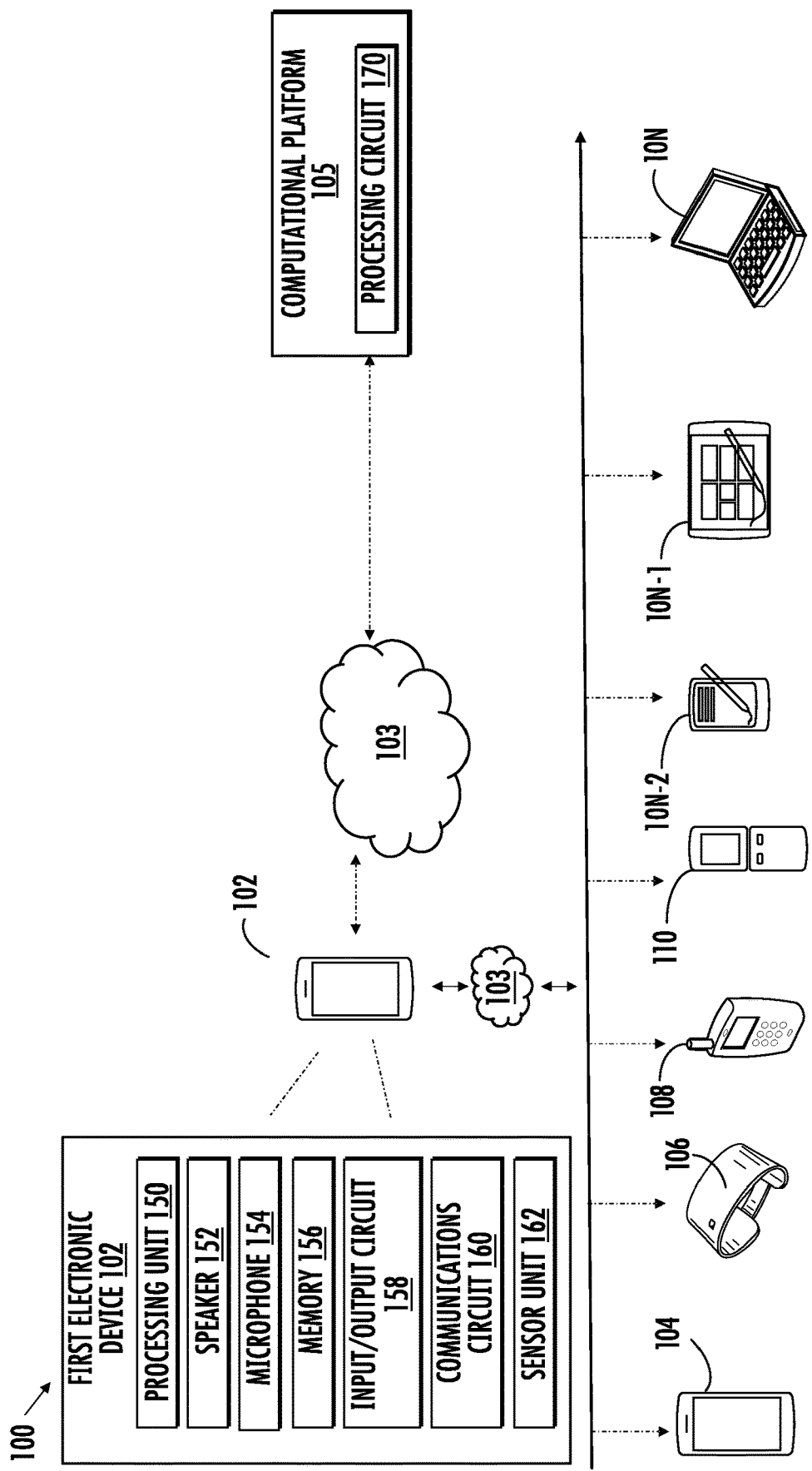
FIG. 1 illustrates an exemplary system comprising a plurality of electronic devices in an environment, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Generally, in a work environment, it may be desired to notify a worker for presence of another worker at a distance. For example, it may be desired to notify a worker that another worker is present at a defined distance so as to assist the worker in completion of a task. In some examples, it may be desired to notify a first worker about a distance at which a second worker is located so as to help the first worker in delegating a task to the second worker. In another example, it may be desired to notify a first worker operating an industrial vehicle (e.g. a forklift) about a distance at which a second worker is located so as to maintain safe distance between the first worker and the second worker. In some examples (e.g. in a material handling environment) it may be desired to alert workers for maintaining safe distancing while handling pallets or items and performing movement in a work area where other mechanical equipments (e.g. conveyors, robotic arms, telescopic conveyors etc.) may be installed.

Further, in some examples, in an industrial environment, there may be some safety protocols for ensuring safety of workers working in the environment. In this regard, in an example, it may be desired to notify a worker to provide medical assistance or first aid to another worker who may be present within a defined distance from the worker. Furthermore, in some examples, some safety protocols can be defined in an environment for preventing spread of infectious diseases like, but not limited to, respiratory illness, influenza, SARS, COVID, etc. amongst the workers in the work environment. In such instances, it may be desired to maintain physical distancing (also commonly known as 'social distancing') amongst the workers while the workers are busy in performing doing day to day activities in the work environment. In this regard, any compromise in adherence to the safety protocols can lead to workers getting infected by viral disease. Accordingly, it may be desired to notify workers about availability of other workers in the environment based on estimated distances amongst the workers.

Typically, there exist some techniques for monitoring movement of the workers in an environment and determining distances between two or more workers in the environment. Some of the existing techniques to determine distance between two workers are based on utilizing data from electronic devices (e.g. mobile phones) used by the workers. For example, some existing techniques for determining distance between the devices are based on using wireless signal strength, GPS location, BLE signal strength. However, these techniques are not effective and has associated limitations. For instance, RSSI strength of wireless signals can vary depending on obstacles or objects in the work environment which may result in inaccurate distance estimation between the electronic devices and resulting in generation of false alerts. Accordingly, there is a need for effectively determining a distance between electronic devices used by workers so that a worker can be alerted about presence of another worker at a defined distance (e.g., but not limited to, when a worker is approaching towards another worker or in case of any violation of any safety norms related to any communicable disease etc.)

Various example embodiments described herein relates to generating alerts on electronic devices. In some examples, the alerts can notify a user about a distance at which the user is located from another user, for various purposes. In some examples, the alerts can be associated with safety protocols for workers in a work environment. For instance, the alerts can be indicative of violation of physical distancing norm between workers in the work environment. In some example embodiments, the alerts can be generated on electronic devices used by respective workers. The alerts can be generated based on determining a distance between the electronic devices and comparing it with a threshold distance value.

According to some example embodiments, the distance between two electronic devices can be determined based on an exchange of signals at ultrasonic frequency between the electronic devices. In this regard, a speaker and microphone of the respective electronic device can be configured to generate and identify signals at ultrasonic frequency. Further, an information related to the exchange of signals at ultrasound frequency can be used to perform a time of flight estimation and determine a first distance value between the two electronic devices. Furthermore, the first distance value can be refined to determine a second distance value by using a machine learning model. The machine learning model can be used to factor in various parameters that affects estimation of distance between electronic devices in the work environment. In this regard, the second distance value determined from the machine learning model can be a relatively accurate representation of actual distance between the two electronic devices than the first distance value. Accordingly, the alerts can be generated by comparing the second distance value against the threshold distance value. Details of various example embodiments for generating the alerts, are described in reference with description of FIGS. 1-11 hereinafter.

The term "electronic device" used hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The various embodiments are described herein using the term "computing platform" or "master device" used interchangeably for the purpose of brevity. The term "computing platform" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the computing platform may correspond to any of, an industrial computer, a cloud computing-based platform, an external computer, a stand-alone computing device, and/or the like. In some example embodiments, the master device or the computing platform, can also refer to any of the electronic devices, as described herein. In some example embodiments, the computing platform may include an access point or a gateway device that can be capable of communicating directly with one or more electronic devices and can also be capable of communicating (either directly or alternatively indirectly via a communication network such as the Internet) with a network establishment service (e.g. Internet service provider). In some example embodiments, the computing platform can refer to a server system that can manage the deployment of one or more electronic devices throughout a physical environment. In some example embodiments, the computing platform may refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

FIG. 1 illustrates an exemplary environment of a system 100 comprising a plurality of electronic devices, e.g. a first electronic device 102, a second electronic device 104, a third electronic device 108 and so on, in accordance with some example embodiments described herein. In some example embodiments, the plurality of electronic devices (102-10N) can correspond to, for example, but not limited to, mobile devices, smartphones, PDTs, PDAs, and/or the like, as described earlier. In some example embodiments, the plurality of electronic devices (102-10N) can also include wearable devices such as, wristwatch, fitness bands, biometric monitors, activity trackers, health bands, etc. In some example embodiments these electronic devices may be used by workers in a work environment (e.g. an industrial environment, a warehouse, a distribution center, a manufacturing unit etc.). For instance, in some examples, the first electronic device 102 can be a first mobile device used by a first worker and the second electronic device 104 can be a second mobile device used by a second worker. In some example embodiments, the plurality of electronic devices 102-10N may correspond to such devices that may be commissioned and/or configured to perform a particular functionality in a working environment, e.g. industrial environment. For instance, in some examples, the plurality of electronic devices 102-10N may correspond to industrial devices e.g. handheld devices, indicia scanners, RFID readers, PDTs, PDAs and/or the like, that may be used by workers working in the industrial environment, e.g. but not limited to, a warehouse, a manufacturing plant, or a distribution center to increase productivity while performing various operations.

According to some example embodiments described herein, the plurality of electronic devices (102-10N) can be configured to alert and track workers for maintaining physical distancing amongst each other. As an example, in case of a pandemic situation e.g. influenza, SARS, COVID, etc., in addition to usual operations like data collection, data identification etc., the plurality of electronic devices (102-10N) can also be used to notify workers by generating alerts related to safety measures and maintaining physical distancing amongst the workers. Alternatively, in other examples, it may be desired to alert a worker regarding presence or absence of another worker at a defined distance from the worker.

According to some example embodiments, the plurality of electronic devices (102-10N) can be configured to generate alerts based on estimated distance amongst the electronic devices. For instance, the first electronic device 102 can generate an alert based on determining a distance between the first electronic device 102 and the second electronic device 104. In some examples, the alert can be indicative of a distance between the first electronic device 102 and the second electronic device 104. In some examples, the alert can be generated on the first electronic device 102, in an instance, where the distance between the first electronic device 102 and the second electronic device 104 is less than a pre-defined distance. In this aspect, the pre-defined distance can be defined according to health safety protocols recommended for an environment. Said that, according to some example embodiments, the first electronic device 102 may generate an alert when a physical distancing norm to be maintained between workers is violated. Accordingly, by way of implementation of various example embodiments described hereinafter, the plurality of electronic devices (102-10N) can be used to generate alerts related to safety, health, and well-being, further details of which are described in reference to FIGS. 2-11.

As illustrated, in some example embodiments, the plurality of electronic devices (102-10N) can be located in a networked environment. The networked environment can correspond to an environment in which the plurality of electronic devices (102-10N) can communicate amongst each other, exchange data and control signals, over a communication network 103. For instance, in some example embodiments, the electronic devices can be communicatively coupled amongst each other over a wireless communication network. In other examples, the networked environment referred herein, can correspond to a peer-to-peer (P2P) network of electronic devices 102-10N that can be communicatively coupled over a P2P communication network. The communication network 103, in some example embodiments can correspond to a medium through which various commands (e.g. control commands), messages, and data, can be exchanged amongst various electronic devices.

In some example embodiments, the communication network 103 can include, but are not limited to, a Wireless Fidelity (Wi-Fi) network, a Piconet, a Personal Area Network (PAN), Zigbee, and a Scatternet. In some examples, the communication network 103 can correspond to a short range wireless network through which the plurality of electronic devices 102-10N can communicate with each other using one or more communication protocols such as, but are not limited to, Wi-Fi, Bluetooth, Bluetooth low energy (BLE), Zigbee, Ultrasonic frequency based network, and Z-Wave. In some examples, the communication network 103 can correspond to a network in which the plurality of electronic devices 102-10N can communicate with each other using other various wired and wireless communication protocols such as Transmission Control Protocol and Internet Protocol (TCP/IP), User Datagram Protocol (UDP), and 2G, 3G, or 4G communication protocols. In some examples, the communication network 103 can correspond to any communication network such as, but not limited to, LORA, cellular (NB IoT, LTE-M, Leaky Feeder Coax, etc.)

According to various example embodiments described herein, any electronic device (e.g., but not limited to, the electronic device 102) of the plurality of electronic devices 102-10N can initiate communication to remaining electronic devices, using the communication network 103. In some examples, a communication from the first electronic device 102 to other electronic devices can be initiated based on occurrence of an event. In some examples, a communication between two electronic devices can be initiated by an instance of a mobile application or a system process or a service. In some examples, the occurrence of the event can correspond to such as, but not limited to, booting of the first electronic device or after a system reset or after a periodic system update, thereby setting up a communication with other electronic devices over the communication network 103. Alternatively, and/or additionally, in some example embodiments, the first electronic device 102 can initialize the communication network 103 based on a user input e.g. worker entering log-in credentials on the electronic device. Said that, in an example embodiment, the first electronic device 102 can initiate a request to connect with the second electronic device 104, over a Bluetooth low energy (BLE)-based communication network. In another example embodiment, the first electronic device 102 can initiate a request to connect with the second electronic device 104, over ultrasound frequency range-based communication network. In some examples, the first electronic device 102 can communicate with the second electronic device 104 by using both communication network types i.e. BLE and ultrasound frequency, details of which are further described in references to FIGS. 2-11. For purpose of brevity, the first electronic device 102 and the second electronic device 104 can be collectively referred as the electronic devices (102, 104) hereinafter.

In accordance with various example embodiments described herein, each electronic device can include a number of components, circuitry, and/or the like that can be configured to perform various operations. As illustrated, the first electronic device 102 can include at least, a speaker 152, a microphone 154, a memory 156, an input/output circuit 158, a communication circuit 160, a sensor unit 162, and a processing unit 150 that can be communicatively coupled to one or more of these components.

According to some example embodiments described herein, the speaker 152 of the first electronic device 102 can be configured to generate output i.e. sound at both audible and non-audible frequency ranges. In some example embodiments, the speaker 152 and the microphone 154 can be configured to support non-audible signals. For instance, in an example, the speaker 152 of the first electronic device 102 can be configured to generate non-audible signals within an ultrasound frequency range. In this regard, in some example embodiments, the speaker 152 can be configured to generate sound signals at a frequency above 20 Kilohertz (kHz). In some example embodiments, the speaker 152 can be configured to generate signals at a range within 18 kHz to 23 kHz, or specifically at a range within 19 kHz to 21 kHz, or more specifically at 20 kHz. In another example embodiment, the speaker 152 can be configured to generate signals at a range within 500 Hz to 50 kHz, or specifically at a range within 1 kHz to 30 kHz, or more specifically at a range within 10 kHz to 20 kHz. Said that, in some examples, the speaker 152 can be configured to generate non-audible signals at ultrasonic sound. Further, as illustrated, the first electronic device 102 can include a microphone 154 that can be configured to identify audible and/or non-audible signals. In some example embodiments, the microphone 154 can be configured to identify non-audible signals transmitted at ultrasound frequency and received at the first electronic device 102. For example, the microphone 154 can identify a signal at ultrasound frequency range that can be transmitted by the second electronic device 104.

According to various example embodiments described herein, the speaker 152 and the microphone 154 of the first electronic device 102 can be used to perform an exchange of non-audible signals at ultrasound frequency. In this regard, according to various example embodiments described herein, information related to exchange of non-audible signals at ultrasound frequency range that can be transmitted and/or received, at the first electronic device 102 can be used to determine the distance between the first electronic device 102 and another electronic device. Further, based on the determined distance, an alert can be generated by the processing unit 150. In some example embodiments, the alert can be generated on both the electronic devices (102, 104). Further, various types of alerts can be generated, details of which are described later in the description. Furthermore, according to some examples, the alert can indicate a violation of physical distancing norm to be maintained between two users in a work environment. In accordance with some example embodiments described herein, remaining of the plurality of electronic devices i.e. the second electronic device 104, the third electronic device 106, etc. can also include one or more of similar components, like the processing unit 150, the speaker 152, the microphone 154, the sensor unit 162 etc., as described in reference to the first electronic device 102.

Illustratively, the system 100 can also include a computing platform 105. In some examples, as described earlier, the computing platform 105 can correspond to a server. In some examples, the computing platform 105 can correspond to, for example, but not limited to, a cloud-based service, a cloud-based platform, a cloud-based infrastructure, a remote server, and/or the like. The one or more of the plurality of electronic devices 102-10N can be communicatively coupled to the computing platform 105, via the communication network 103. In other words, the plurality of electronic devices (102-10N) can communicate with the computing platform 105 using the communication network 103 for a various purposes. For instance, in some examples, the computing platform 105 can communicate with one or more of the plurality of electronic devices (102-10N) to: share configuration settings, retrieve data captured by the devices, monitor status of one or more of the plurality of electronic devices, track activities and performance of the electronic devices, share device updates, provision workflows on the devices, track usage history of the electronic devices, etc.

In some example embodiments, the computing platform 105 can correspond to a data analytics platform that can be configured to receive data from one or more of the plurality of electronic devices 102-10N, perform analysis on the data, and provide actionable insights to the plurality of electronic devices 102-10N. In some examples, the computing platform 105 can be used by an administrator of a work environment to monitor activities of workers based on transaction amongst the electronic device, tracking of the plurality of electronic devices 102-10N, and/or data received from the plurality of electronic devices 102-10N. In some example embodiments, one or more of the plurality of electronic devices (102-10N) can run an application (e.g. a mobile application) that can be hosted by the computing platform 105. As illustrated, the computing platform 105 can include a processing circuit 170. Additionally, and/or alternatively, the computing platform 105 can also include one or more components similar to, the memory 156, the input/output circuit 158, the communication circuit 160, as described in reference to the first electronic device 102. Following paragraphs of description of FIG. 1 describe details of one or more hardware components, circuitry etc. of the plurality of electronic devices (102-10N) and/or the computing platform 105.

For purpose of brevity, the processing unit 150 of the electronic devices and the processing circuit 170 of the computing platform 105 collectively can be referred as processing unit (150, 170) hereinafter throughout the description. The processing unit (150, 170) can be a hardware entity (e.g., physically embodied in circuitry) capable of performing operations according to one or more embodiments of the disclosure. Alternatively, in an embodiment where the processing unit (150, 170) is embodied as an executor of software instructions, the software instructions can configure the processing unit (150, 170) to perform one or more algorithms and/or operations described herein in response to the software instructions being executed. In an embodiment, the processing unit (150, 170) can be a single core processor, a multi-core processor, multiple processors internal to the system 100, a remote processor (e.g., a processor implemented on a server), and/or a virtual machine. According to some example embodiments, the processing unit (150, 170) can correspond to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, the processing unit (150, 170) can refer to an integrated circuit, an application-specific integrated circuit (ASIC), a digital signal processor (DSP), a field-programmable gate array (FPGA), a programmable logic controller (PLC), a complex programmable logic device (CPLD), a discrete gate or transistor logic, discrete hardware components, or any combination thereof designed to perform the functions described herein. In some examples, the processing unit (150, 170) can also exploit Nano-scale architectures such as, but not limited to, molecular and quantum-dot based transistors, switches and gates, in order to optimize space usage or enhance performance of user equipment.

In accordance with some example embodiments, the sensor unit 162 of the electronic device can include one or more sensors. In an example embodiment, the sensor unit 162 can include inertial sensors e.g. a magnetometer, a geomagnetic field sensor, an accelerometer, an actometer, and/or the like. In this regard, the processing unit 150 can utilize the sensor unit 162 to detect one or more of an orientation, a movement, etc. of the first electronic device 102. In some example embodiments, the sensor unit 162 can include sensors, for example, imaging devices, like, a color camera and/or a depth camera, photo eyes, fullness sensors, volume sensors, speed sensors, RFID interrogator, scan engine, barcode scanner, indicia reader, and/or the like.

According to some example embodiments, the plurality of electronic devices (102-10N) and/or the computing platform 105 can include a communication circuit (e.g. the communication circuit 160) that can be configured to receive and/or transmit data from/to a network and/or any other device, circuitry, or module in communication over the communication network 103. To this end, in some example embodiments, the communications circuit 160 referred herein, can be any means such as a device or circuitry embodied in either hardware or a combination of hardware and software associated with the respective component of the first electronic device 102. In some examples, the communications circuit 160 can comprise a network interface for enabling communications with a wired or wireless communication network. For example, the communications circuitry can comprise one or more network interface cards, antennae, buses, switches, routers, modems, and supporting hardware and/or software, or any other device suitable for enabling communications via the communication network 103. Additionally, or alternatively, the communications circuit 160 can comprise the circuitry for interacting with the antenna(s) to cause transmission of signals via the antenna(s) or to handle receipt of signals received via the antenna(s). These signals can be transmitted by any of the components of the first electronic device 102 and/or the processing unit 150 over the communication network 103, using a number of wireless personal area network (PAN) technologies, such as, but not limited to, Bluetooth® v1.0 through v3.0, Bluetooth Low Energy (BLE), infrared wireless (e.g., IrDA), ultra-wideband (UWB), induction wireless transmission, and/or the like or via a wired communication technology, such as a data field bus, cables etc.

In some example embodiments, the plurality of electronic devices (102-10N) and/or the computing platform 105 can include an input/output circuit (e.g. the I/O circuit 158) that can be in communication with the processing unit 150 to provide output to a user and, in some embodiments, to receive an indication of user input. The I/O circuit 158 can comprise a user interface and can comprise a display that can comprise a web user interface, a mobile application, a client device, and/or the like. In some embodiments, the I/O circuit 158 can also comprise a keypad, a joystick, a touch screen, touch areas, soft keys, a microphone, a speaker, or other input/output mechanisms. In some examples, the processing unit 150 and/or a user interface circuitry comprising a processor associated with the I/O circuit 158 can be configured to control one or more functions of one or more user interface elements associated with the I/O circuit 158 through computer program instructions (e.g., software and/or firmware) stored on the memory 156 accessible to the processing unit 150. Further details of the components of the first electronic device 102 and/or the plurality of electronic devices (102-10N) are also described in reference to FIGS. 9-10.

Figure 2:
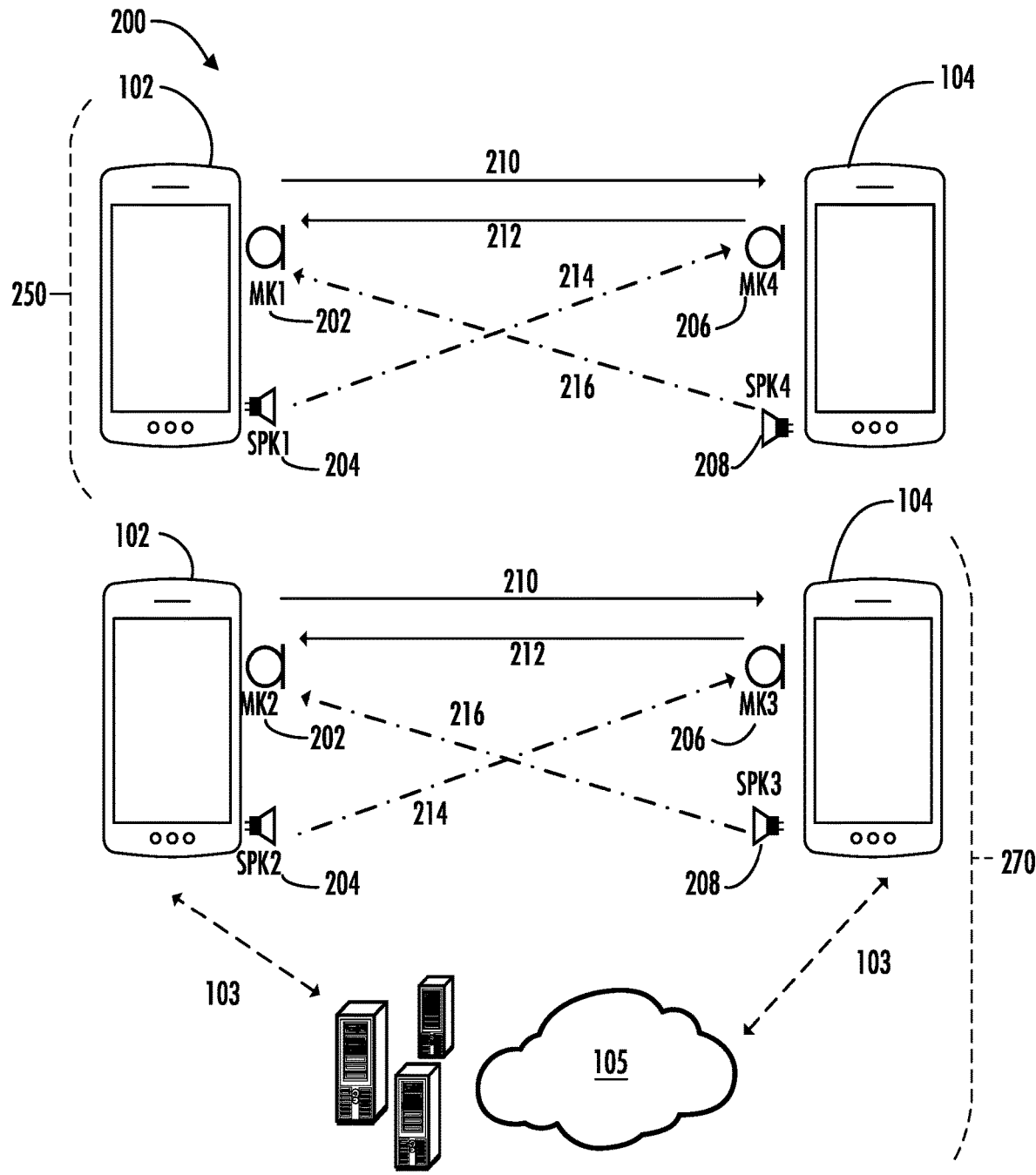
FIG. 2 illustrates an example scenario depicting communication between a first electronic device and a second electronic device based on exchange of signals at ultrasound frequency range, in accordance with an example embodiment described herein.

FIG. 2 illustrates an example scenario 200 depicting an example of communication between the first electronic device 102 and the second electronic device 104 that involves an exchange of signals at ultrasound frequency range, in accordance with an example embodiment described herein. Illustratively, the first electronic device 102 can include a first microphone (MK1) 202 and a first speaker (SPK1) 204. Further, the second electronic device 104 can include a second microphone (MK2) 206 and a second speaker (SPK2) 208. In accordance with some example embodiments described herein, the first speaker 204 and the second speaker 208 can be configured to generate non-audible signals in a predefined range of ultrasound frequency. For instance, in some examples, the first speaker 204 and the second speaker 208 can be configured to generate a plurality of signals at a range within 18 kHz to 23 kHz, or specifically at a range within 19 kHz to 21 kHz, or more specifically at 20 kHz. Further, the first microphone 202 and the second microphone 206 can be configured to identify non-audible signals at the ultrasound frequency range, which can be received at the first electronic device 102 and the second electronic device 104, respectively.

Illustratively, according to an example embodiment, the first speaker 204 of the first electronic device can generate a first signal 214 at a first ultrasound frequency. The first signal 214 can be received and identified by the second microphone 206 of the second electronic device 104. Further, the second speaker 208 can generate a second signal 216 at a second ultrasound frequency. The second signal 216 can be received and identified by the first microphone 202 of the first electronic device 102. According to some example embodiments, a range of ultrasound frequency at which the exchange of ultrasound frequency-based non-audible signals can be predefined is predefined. In other words, the first ultrasound frequency and the second ultrasound frequency can be pre-defined and known to the electronic devices (102, 104). For instance, the first ultrasound frequency and the second ultrasound frequency can be defined according to device configuration settings. In some examples, the device configuration settings can be predefined by an original equipment manufacturer (OEM). Alternatively, in some examples, the device configuration settings can be customized based on user input (e.g. by an administrator in a work environment). Thus, the first speaker 204 and the second speaker 208 can generate non-audible signals at various predefined ranges of ultrasound frequency defined according to device configuration settings.

In some examples, the computing platform 105 can define configuration settings for the first electronic device 102 and the second electronic device 104. In other words, the computing platform 105 can provision configuration settings to the electronic devices (102-10N) which can define an ultrasound frequency range, at which the electronic devices (102, 104) can communicate with each other. In this regard, in some examples, the computing platform 105 can provision the configuration settings based on a user input (e.g. by an administrator) at the computing platform 105. Accordingly, the first electronic device 102 and the second electronic device 104 can receive device configuration settings from the computing platform 105. In some examples, in addition to the ultrasound frequency range, the configuration settings can also include information such as, a start time and end time for exchanging signals at the ultrasound frequency based on which the first electronic device 102 and the second electronic device 104 can communicate with each other, more details of which are described later in the description.

According to some example embodiments, each of the first electronic device 102 and the second electronic device 104 can be configured with a mobile application. In some examples, the mobile application can be hosted by the computing platform 105 and can run on the first electronic device 102 and the second electronic device 104, respectively. In accordance with some example embodiments described herein, the mobile application can (a) initiate communication between the first electronic device 102 and the second electronic device 104 (e.g. over BLE and/or ultrasound frequency), (b) determine a distance between the first electronic device 102 and the second electronic device 104, and (c) generate alerts on the respective electronic devices (102, 104) based on the distance between the first electronic device 102 and the second electronic device 104.

According to some example embodiments, the mobile application can be pre-installed on electronic devices used within a work environment. For instance, in some example embodiments, in a work environment (e.g. a warehouse, an industrial environment, a distribution center, etc.), workers can be provided with electronic devices (like the first electronic device 102 and the second electronic device 104) which can be preconfigured with the mobile application to perform various activities. As an example, workers can use these electronic devices for automatic identification and data capturing of information and to improve productivity in the work environment. Further, the mobile application that can be installed on the electronic devices (102, 104) can be configured to monitor proximity between the electronic devices and further generate alerts on the electronic devices in situations when a social distance (or physical distancing) compliance norm gets violated. For example, a social distance compliance norm can be that two workers can have to maintain a distance of 6 feet or more between themselves while working in the work environment. In this regard, according to some example embodiments, the mobile application can be configured to determine a distance between the electronic devices (102, 104). Further, according to various example embodiments described herein, the distance between the electronic devices (102, 104) can be determined by using information corresponding to exchange of ultrasound frequency signals (i.e. signals transmitted and/or received at the electronic devices at ultrasound frequency range), details of which would be described later in the description.

As described earlier in reference to FIG. 1, the first electronic device 102 can communicate with the second electronic device 104 using the communication network 103. According to various example embodiments described herein, communication between the electronic devices (102, 104) can be performed by using a BLE based signals or ultrasound frequency-based signals, and/or a combination of both (i.e. by periodically switching between two communication modes). In some example embodiments, exchange of non-audible signals at ultrasound frequency between the first electronic device 102 and the second electronic device 104 can be performed after determining if the two electronic devices are in BLE communication range of each other. In this regard, the electronic devices (102, 104) can initially establish a BLE based communication and thereafter exchange non-audible signals over ultrasound frequency. To this end, using BLE based connection establishment before initiating ultrasound frequency-based signal transmission can save resources (e.g. battery or processing cycles) of the electronic devices (102, 104).

FIG. 2 illustrates two example views depicted as a first view 250 and a second view 270, respectively. The first view 250 represents an example scenario in which the first electronic device 102 and the second electronic device 104 are communicatively coupled to each other. As illustrated in the first view 250, communication between the first electronic device 102 and the second electronic device 104 can be performed using a BLE based signal transmission and/or ultrasound frequency-based signal transmission. The second view 270 represents another example scenario where the first electronic device 102 and the second electronic device 104 are communicatively coupled to each other and are further communicatively coupled to the computing platform 105 (e.g. a server).

Referring to the first view 250, according to some example embodiments, the first electronic device 102 can transmit a connection request 210 to the second electronic device to establish a connection over BLE network. In response to the connection request, the first electronic device 102 can receive a response from the second electronic device 104. To this end, the response can be received from the second electronic device 104, in an instance, when the second electronic device 104 is within a Bluetooth communication range of the first electronic device 102. Said differently, the first electronic device 102 may not receive any response to the connection request 210, in an instance, when there no other electronic device present within the Bluetooth communication range of the first electronic device 102. Upon receiving the response, BLE based connection can be established between the first electronic device 102 and the second electronic device 104. Upon establishing connection over BLE, the first electronic device 102 and the second electronic device 104 can exchange data using the BLE based communication. Furthermore, according to some example embodiments, in response to successful BLE based connection between the first electronic device 102 and the second electronic device 104, exchange of signals at ultrasound frequency can be initiated. Following paragraph describes an example of exchange of signals at ultrasound frequency between two electronic devices (102, 104).

Illustratively, the first speaker 204 of the first electronic device 102 can generate the first signal 214 at the first ultrasound frequency. In an example, the first signal 214 may be broadcasted by a communications circuit (e.g. similar to the communication circuit 160) of the first electronic device 104. Further, the first signal 214 may be received at the second electronic device 104. In this aspect, the second microphone 206 of the second electronic device 104 can identify the first signal 214. Similarly, the second speaker 208 of the second electronic device 104 may generate the second signal 216 at the second ultrasound frequency. The second signal 216 may be broadcasted by a communications circuit of the second electronic device 104. Further, as illustrated, the second signal 216 can be received at the second electronic device 104 and can be identified by the second microphone 206. In accordance with various example embodiments described herein, the exchange of non-audible signals at ultrasound frequency range between the two electronic devices 1(102, 104) can be used to determine the distance between the two electronic devices (102, 104). In this regard, a timing information associated with the exchange of the non-audible signals at ultrasound frequency can be used to perform a time of flight estimation to determine an estimated distance between the two electronic devices (102, 104). Further, the distance determined based on the time of flight estimation can be refined based on an output of a machine learning model, details of which are described later in description.

The second view 270 illustrated in the FIG. 2 represents an example scenario of communication between the first electronic device 102 and the second electronic device 104, similar to one depicted in the first view 250, except that the first electronic device 102 and the second electronic device 104 are also communicatively coupled to the computing platform 105. In this regard, as described earlier, in some examples, the first electronic device 102 and/or the second electronic device 104 can communicate with the computing platform 105 by using the communication network 103. For instance, in some examples, the computing platform 105 can share device configuration settings with the first electronic device 102 and the second electronic device 104. In some examples, the computing platform 105 can synchronize time clocks maintained at the first electronic device 102 and the second electronic device 104, respectively. Further, the computing platform 105 can send to the electronic devices (102, 104), the device configuration settings that can define, for example, but not limited to, a frequency range, a start time, and a stop time based on which the electronic devices (102, 104) can perform communication of ultrasound frequency-based signals. In some examples, the computing platform 105 can share the device configuration settings for the electronic devices (102, 104) based on analytics on past user behavior and job assignment data for each user/worker associated with respective devices.

Figure 3:
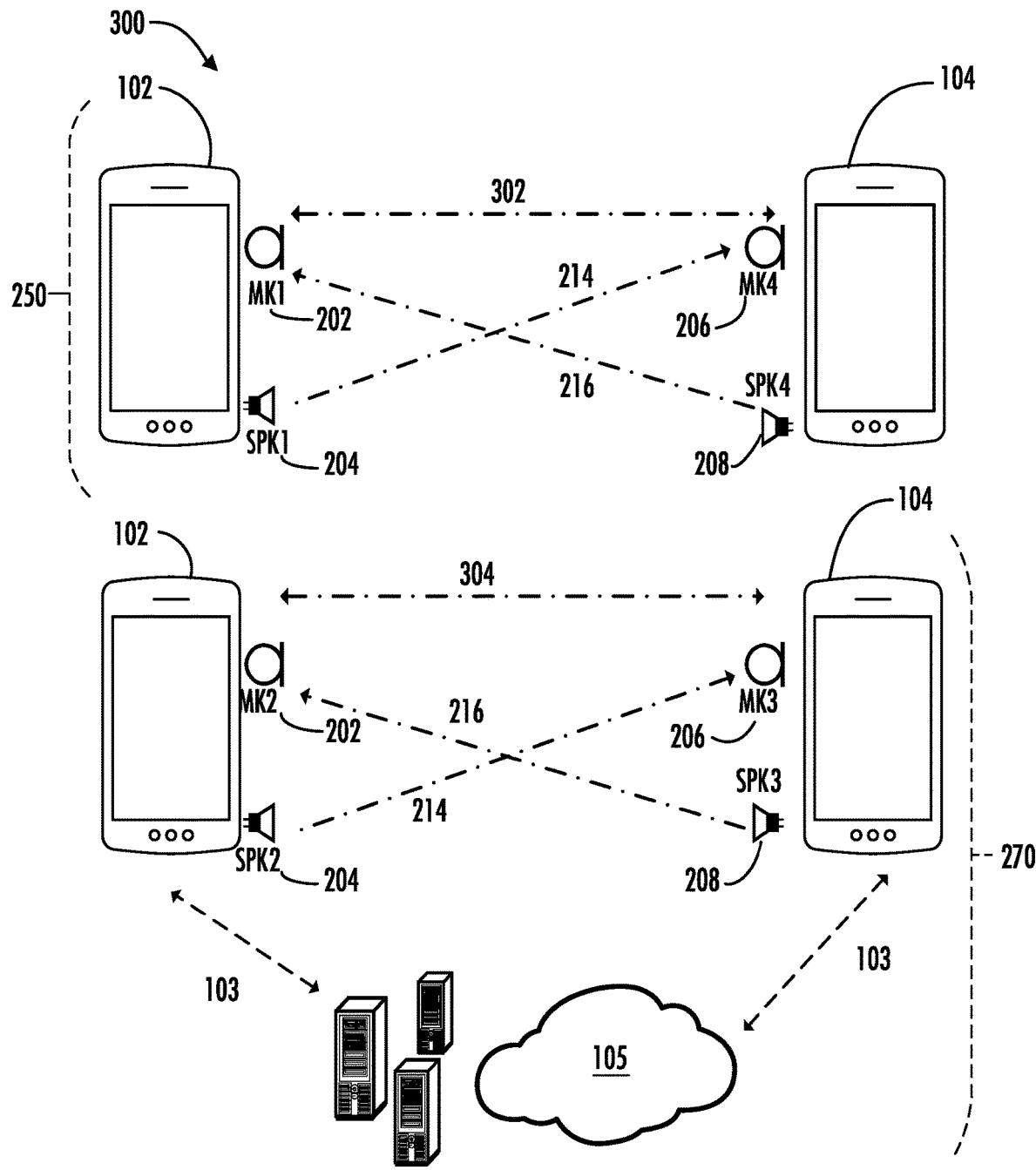
FIG. 3 illustrates an example scenario depicting communication between a first electronic device and a second electronic device based on exchange of signals at ultrasound frequency range, in accordance with another example embodiment described herein.

FIG. 3 illustrates another example scenario 300 depicting communication between the first electronic device 102 and the second electronic device 104 that includes exchange of non-audible signals at ultrasound frequency, in accordance with another example embodiment described herein. In this example scenario, the first electronic device 102 and the second electronic device 104 can use signals transmitted at ultrasound frequency as a medium for data communication. For instance, as illustrated in the first view 250, the first electronic device 102 and the second electronic device 104 can communicate data to each other by using an ultrasound data exchange signal 302. Accordingly, as illustrated in the second view 270, the first electronic device 102 and the second electronic device 104 can communicate data to each other by using another ultrasound data exchange signal 304. The example scenario illustrated in FIG. 3 may be applicable for a use case in which an electronic device used within a work environment may not be compatible for performing BLE based communication. Further, similar to as described in reference to FIG. 2, the first electronic device 102 and the second electronic device 104 can exchange the first signal 214 and the second signal 216 transmitted at ultrasound frequency.

Figure 4:
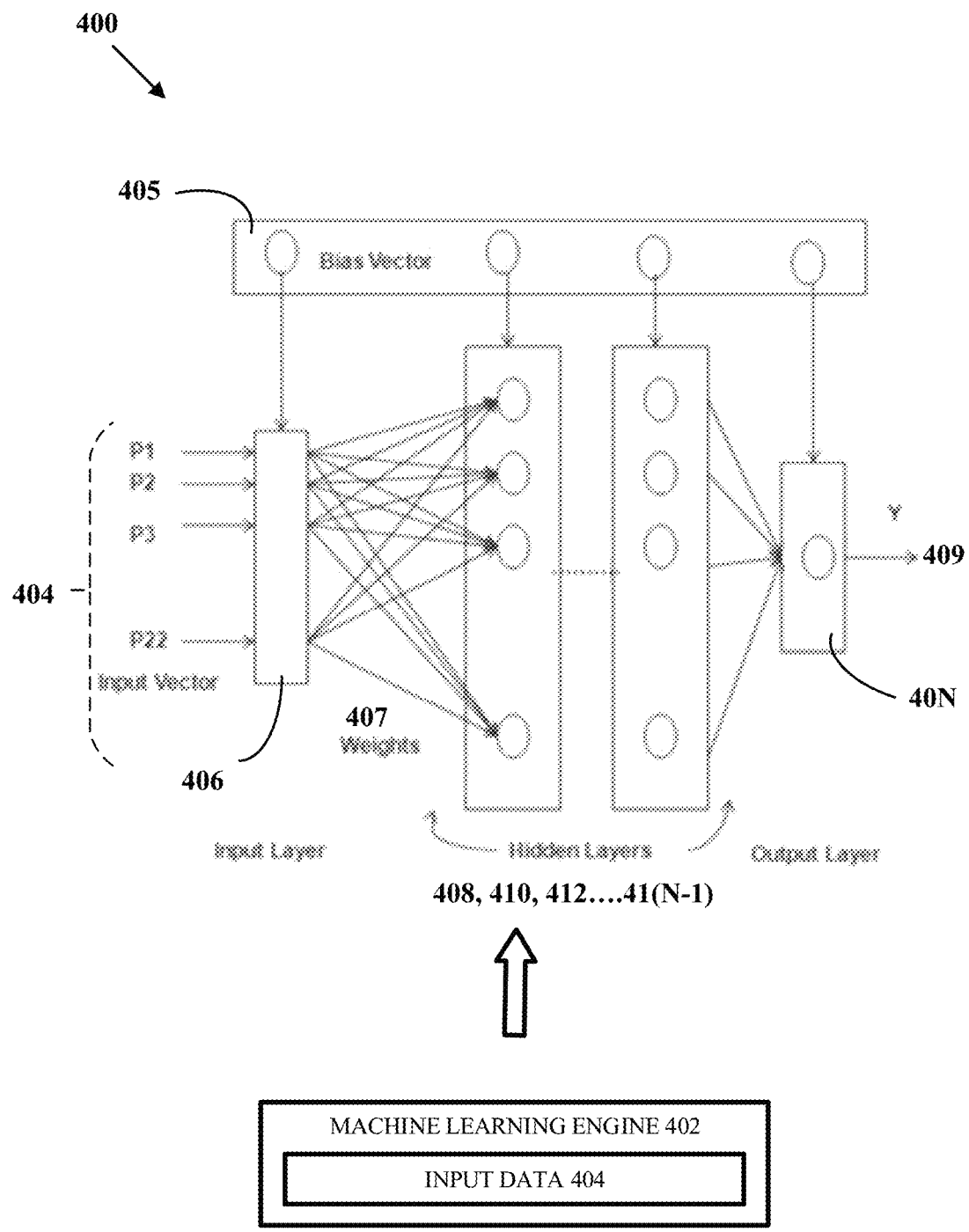
FIG. 4 illustrates an example architecture of a machine learning model used for computing a distance between two electronic devices, in accordance with some example embodiments described herein.

FIG. 4 illustrates an example architecture 400 of a machine learning model that can be used for computing a distance value between two electronic devices, in accordance with some example embodiments described herein. According to some example embodiments, the machine learning model can be used to refine a first distance value and determine a second distance value from the first distance value. In this regard, the first distance referred herein corresponds to a distance between two electronic devices (e.g. the first electronic device 102 and the second electronic device 104) which can be determined by performing a time of flight estimation using the timing information related to exchange of ultrasound frequency signals, as described earlier in reference to FIGS. 1-3. In this aspect, the second distance value can provide a relatively accurate estimation of the distance between the electronic devices (102, 104) compared to the first distance value. Further, the second distance value can be used for generating alerts on the electronic devices (102, 104)

In accordance with some example embodiments, the machine learning model can be generated by a machine learning engine 402, as illustrated in FIG. 4. According to various example embodiments described herein, the machine learning engine 402 can use the input data 404 and a neural network architecture to generate the machine learning model. The machine learning engine 402 can be a component of any of plurality of electronic devices (102-10N) and/or the computing platform 105. In some example embodiments, the machine learning engine 402 can be communicatively coupled to the processing unit (150, 170). The machine learning engine 402 can employ one or more machine learning process and/or one or more artificial intelligence techniques to refine the first distance value between the two electronic devices (102, 104) and determine the second distance value. In this regard, the machine learning model employed by the machine learning engine 402 can output a distance correction factor that can be used to modify the first distance value and determine the second distance value.

In certain embodiments, output of the machine learning model employed by the machine learning engine 402 can be associated with a data model description. For example, the data model description can describe one or more distance correction factors in a computer format. In an aspect, the data model description can include properties and/or data associated with hardware, sensors and/or other data that are employed to facilitate determination of distance between two electronic devices (102, 104) and generate alerts. Additionally, or alternatively, the data model description can include data associated with digital signal processing. Additionally, or alternatively, the data model description can include data associated with one or more machine learning processes. Additionally, or alternatively, the data model description can include data associated with a prediction for correction in distance value that can be used for refining the first distance value to the second distance value, as described earlier in reference to FIGS. 1-3.

In an example embodiment, the machine learning engine 402 can employ a support vector machine (SVM) classifier to determine one or more classifications, one or more correlations, one or more expressions, one or more inferences, one or more patterns, one or more features and/or other learned information related to the input data 404. In another embodiment, the machine learning engine 402 can employ one or more machine learning classification techniques associated with a Bayesian machine learning network, a binary classification model, a multiclass classification model, a linear classifier model, a quadratic classifier model, a neural network model, a probabilistic classification model, decision trees and/or one or more other classification models. The machine learning model (e.g., the classification model, the machine learning classifier, etc.) employed by the machine learning engine 402 can be explicitly trained (e.g., via training data) and/or implicitly trained (e.g., via extrinsic data received by the machine learning model). For example, the machine learning model (e.g., the classification model, the machine learning classifier, etc.) employed by the machine learning engine 402 can be trained with training data (i.e. the input data 404) that includes one or more samples of distance values recorded by keeping the electronic devices (102, 104) at known positions at varying instances of the pre-defined factors, details of which are described hereinafter.

According to various example embodiments described herein, the machine learning engine 402 can generate the machine learning model. The machine learning model can (a) use the input data 404, (b) perform regression analysis on the input data 404, and (c) output a classification indicative of a distance correction factor. Further, the distance correction factor outputted by the machine learning model can be used by the processing unit (150, 170) to refine the first distance value and determine the second distance value. According to some example embodiments, the machine learning engine 402 can perform learning (e.g., deep learning, etc.) by using the input data 404 to determine one or more classifications, one or more correlations, one or more expressions, one or more inferences, one or more patterns, one or more features and/or other learned information related to the input data. In this regard, the input data 404 can represent training data set for the machine learning model.

According to some example embodiments, the input data 404 to the machine learning model can include a set of distance values that may have been recorded during collection of training data based on performing time of flight estimation (i) at the various values of predefined factors and (ii) when the two electronic devices (102, 104) were placed at known positions (i.e. known distance apart from each other). As stated earlier, the pre-defined factors can be representative of factors that can affect calculation of the distance between the electronic devices (102, 104) by performing time of flight estimation using the timing information related to the exchange of the non-audible signals at ultrasound frequency between the electronic devices (102, 104), details of which are described in following few paragraphs.

A time of flight-based estimation of the distance between two electronic devices (102, 104) can be affected based on various factors. For example, speed of ultrasound waves can vary depending on a temperature of a work environment. Accordingly, a time of flight based estimation results in giving different distance values between two electronic devices (102, 104) which are kept at known locations, at different values of temperature of the environment in which the two electronic devices (102, 104) may be present. In this aspect, the input data 404 used by the machine learning model may include sample distance values that may have been determined by performing time of flight estimation, at different values of temperature of an environment (e.g., but not limited to, 16 degrees C., 20 degrees C., 24 degrees C., 28 degrees C., 32 degrees C., etc.) and by keeping the two electronic devices (102, 104) at known distance apart.

As another example, an angular orientation of the first electronic device 102 and the second electronic device 104 can also affect the time of flight-based estimation of the distance between the two electronic devices (102, 104). In other words, during an exchange of the signals at ultrasound frequency, the first electronic device 102 may be positioned at a first angular orientation and the second electronic device 104 may be positioned at a second angular orientation that may be different than the first angular orientation. Moreover, angular orientation of one or more of the first microphone 202, the first speaker 204, the second microphone 206, the second speaker 208, and the communications circuitry of the first electronic device 102 and the second electronic device 104, respectively, can be at different relative to each other. Thus, a time of flight estimation of the distance between the two electronic devices (102, 104) may not be indicative of an accurate distance between the two electronic devices (102, 104). Said differently, the angular orientation of the electronic devices (102, 104) and its respective components can also affect the estimation of the distance between the electronic devices (102, 104). To this end, an error in estimation of the distance can also vary depending on a distance between the microphone and speakers (of both electronic devices 102, 104) during the exchange of non-audible signals at the ultrasound frequency. Also, while the first electronic device 102 and the second electronic device 104 may positioned be at different angular orientation, ultrasound waves corresponding to exchange of signals may follow different paths to reach from source device to destination device. For example, the ultrasound waves may follow a first path to travel from the first electronic device 102 to the second electronic device 104, in an instance, when both the electronic devices (102, 104) are facing each other. Further, the ultrasound waves may follow a second path different than the first path, in an instance, when both the electronic devices (102, 104) are not facing each other. Thus, a time of travel of the signals between two electronic devices may depend on the angular orientation of the electronic devices (102, 104), thereby, resulting in variation in estimation of the distance between the two electronic devices (102, 104) based on time of flight. Accordingly, a distance determined between the two electronic devices (102, 104) when both the electronic devices (102, 104) are kept vertical (i.e. at same angular orientation of 90 degrees with respect to a surface) would be different than a distance value determined when both the electronic devices (102, 104) are at different angular orientation. Having said that, the input data 404 for the machine learning model can also include sample distance values that may have been determined by performing time of flight estimation, at different values of angular orientation of the electronic devices (102, 104) and its associated components.

According to some example embodiments, other factors such as, a device specification information (e.g. device model number, device specification etc.) associated with the plurality of electronic devices (102-10N) can also be factored in, while gathering sample training data (i.e. the input data 404 for the machine learning model). For instance, each electronic device (102-10N) can be of a unique device specification (e.g. size, external design, internal component arrangement, etc.) depending on a model or type of the electronic device (102-10N). Said differently, internal positioning or arrangement of, microphone, speaker, and/or communication circuitry would be different in the electronic devices of different models. Similarly, electronic devices of different model types may have different external structure, size, and shape. Thus, the device specification information associated with the electronic devices may also affect the determination of the distance between the electronic devices based on time of flight estimation. Accordingly, the input data to the machine learning model may also include sample distance values that may have been recorded by keeping the electronic devices of different device specification at known positions.

Furthermore, in some examples, other factors such as, a state of movement and usage history associated with at least one of the first electronic device 102 and the second electronic device 104 may also affect the determination of the distance between the electronic devices (102, 104). For instance, if a worker using any of the two electronic devices (102, 104) is in state of motion, the distance estimated using time of flight may vary according to the state of motion associated with the worker. Also, in some examples, movement of workers in the work environment may be according to shift timings of the workers. Accordingly, the usage history of the electronic devices (102, 104) may also affect the estimation of the distance between the electronic devices (102, 104). Thus, in accordance with some example embodiments, the input data 404 may also include sample distance values between the two electronic devices which have been recorded according to a device usage history and/or state of the movement associated with the electronic devices (102, 104). As described earlier, the electronic devices (102, 104) may comprise the sensor unit 162 that may include inertial sensors such as, a magnetometer, a geomagnetic field sensor, an accelerometer, an actometer, and/or the like, to determine inertial data (e.g. the angular orientation) associated with the electronic devices (102, 104) and its components. Accordingly, sensory data recorded by the sensor unit 162 can be used to determine the state of movement, angular orientation etc. associated with the electronic devices (102, 104).

In accordance with various example embodiments described herein, the machine learning engine 402 may employ an artificial neural network (ANN) based architecture that may comprise a plurality of layers. In some example embodiments, the machine learning engine 402 may employ a convolutional neural network (CNN). According to an example embodiment, the machine learning engine 402 may employ a three-layer ANN. As illustrated, the architecture 400 (e.g. a neural network-based architecture) may include an input layer 406, a plurality of hidden layers 408-40(N−1), and an output layer 40N. In some example embodiments, the machine learning engine 402 can perform regression analysis to model a relationship between the input data 404 and an output 409 at the output layer 40N of the ANN. The input data 404, as described earlier, may be provided in form of input vectors (P1-P22) at the input layer 406. Further, in accordance with some example embodiments, neurons in each layer of the architecture 400 can be fully interconnected by connection strengths, illustrated as weights 407. Also, each hidden and output layer neuron can include a bias term 405 associated with it. According to some example embodiments, for the ANN, initial weights and thresholds can be obtained by any known algorithm (for example, but not limited to, Levenberg-Marquardt algorithm) that can be used for fitting non-linear curve while performing the regression analysis. Further, the output 409 of the ANN can be a classification (e.g. a distance correction factor that can be used to refine the first distance value to the second distance value, as described earlier in reference to FIGS. 1-3).

In accordance with some example embodiments, number of layers in the architecture 400 can be determined based on various factors and observations derived from experimental results. For instance, a number of the plurality of hidden layers (408-40N-1) can be determined empirically based on experimental observations. As an example, it may be observed experimentally that an increase in classification rate (i.e. accuracy of output of the model) and a decrease in standard deviation in the output can be achieved, in response to, an increase in a number of the hidden layers. Said that, in an example embodiment, during experimentation, initially the ANN can be trained and tested with one hidden layer and subsequently a number of neurons can be increased from a first value to a second value. Further, a subsequent hidden layers (i.e. a second hidden layer) can be added and performance of the model can be observed experimentally by increasing a number of neurons. Accordingly, the number of hidden layers (408-40N-1) can be defined at which optimum classification rate can be achieved. According to an example embodiment, a number of input neurons can be based on a number of the predefined factors (e.g., angular orientation, temperature of environment, device specification etc.) that affects calculation of the distance by performing the time of flight-based estimation. Accordingly, an optimal number of hidden layers, neurons and the optimal learning rate that can be used in the ANN can be determined by performing trial and error and based on observing experimental results.

Furthermore, according to some example embodiments described herein, each layer of the ANN may be associated with a transfer function (e.g. an activation function) that can determine an output of the respective layer. In other words, the transfer function can map output of a layer of the ANN to an input to that layer. In an example embodiment, the machine learning engine 402 can use the transfer function (e.g., but not limited to, a ReLU function, logistic or Sigmoid function, etc.) to map the output of a layer of the ANN with the input to that layer. According to an example embodiment, the machine learning engine 402 may use a non-linear activation function for each hidden layer (408-4N-1) of ANN. In an example embodiment, the machine learning engine 402 may use Rectified linear unit (ReLU) function as a transfer function for each hidden layer of the ANN. The ReLU function may be as a function as stated below:

$$y=\max(0,x) \text{ or } f(x)=\{o \text{ for } x<0; x \text{ for } x\geq 0\}$$

In the above equation y and f(x) represents output value and x represents an input value at a layer of the ANN.

According to some example embodiments, the machine learning engine 402 may also use an error function or loss function to determine an error between an actual output of the layer of the ANN and an expected or predicted output at that layer. In an example, the machine learning engine 402 may use a squared error function (e.g. Mean squared effort function) as an evaluation criterion to evaluate performance of the machine learning model. In this regard, in an example, the squared error function can minimize a mean of squares of errors produced in each iteration of the ANN and can update the weights 407 and biases 407, accordingly. The machine learning model generated by the machine learning engine 402 can predict a discrete value of an output that may correspond to the distance correction. In this regard, the output 409 of the machine learning model is the distance correction factor that can be used to determine the second distance value from the first distance value.

In an example scenario, the first distance value between the electronic devices (102, 104) which is determined by the time of flight estimation can be 6.5 feet. Further, the pre-defined threshold distance used to trigger an alert can be 6 feet. Furthermore, the second distance value determined based on the output of the machine learning model can be 5.5 feet. In this regard, the alert can be generated on the first electronic device 102 and/or the second electronic device 104 based on comparison of the second distance value with the pre-defined threshold (i.e. 5.5 feet<=6 feet).

Figure 5:
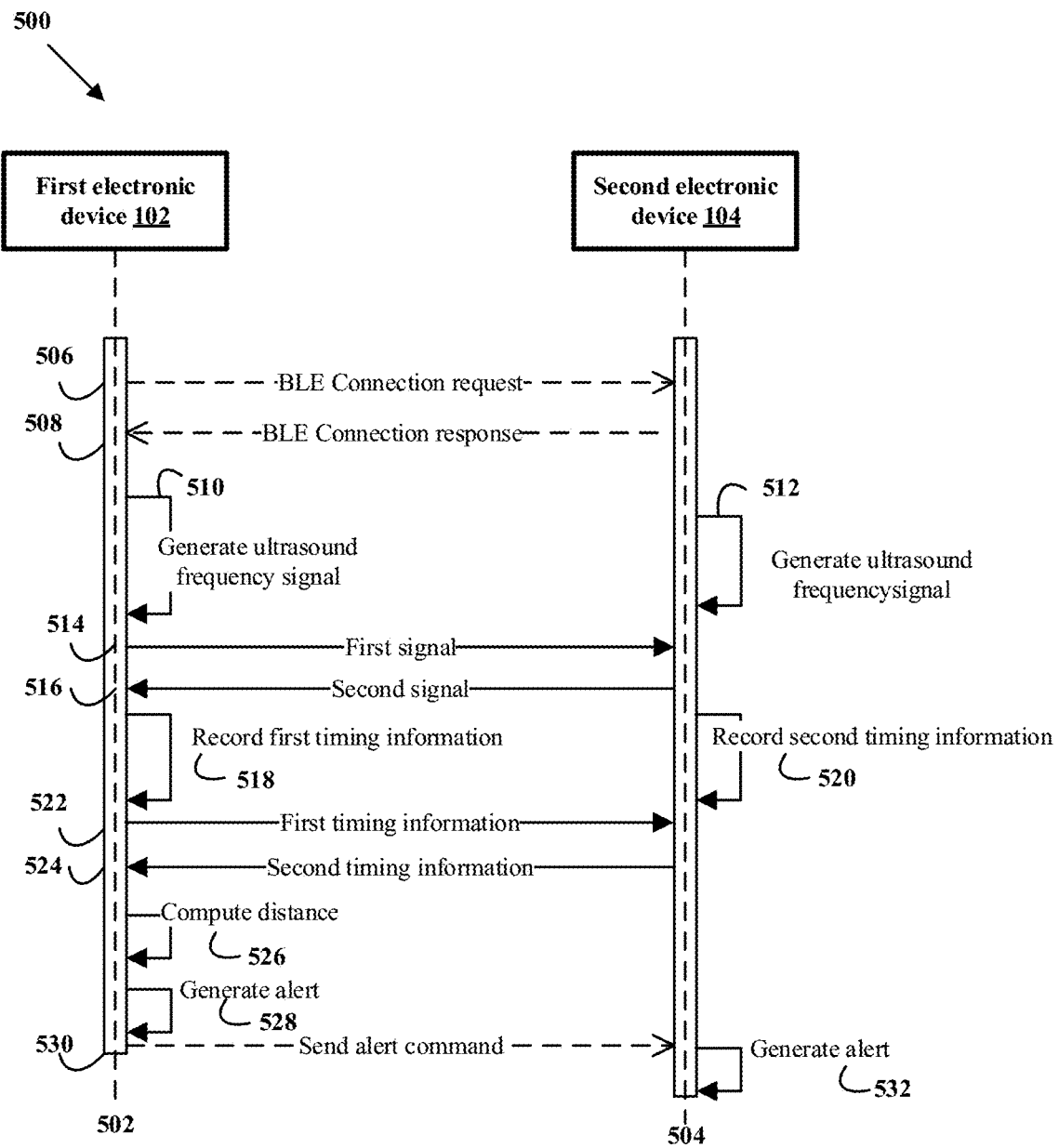
FIG. 5 illustrates a message flow diagram depicting communication between a first electronic device and a second electronic device, in accordance with some example embodiments described herein.

FIG. 5 illustrates a message flow diagram 500 depicting an example of communication between the first electronic device 102 and the second electronic device 104, in accordance with some example embodiments described herein.

According to some example embodiments described herein, the first electronic device 102 and the second electronic device 104 can correspond to handheld devices (e.g. mobile devices, PDAs) that can be used by a first worker and a second worker respectively, in a work environment to perform various operations. For instance, in some examples, the first electronic device 102 and the second electronic device 104 can be used by workers for performing activities such as, but not limited to, executing workflow of tasks, automatic data gathering and identification, handling coordination, engagement, and management of workers, etc. In some examples, the electronic devices (102, 104) can be used by workers in a material handling environment (e.g. a warehouse, a distribution center, an order fulfillment center, an inventory, a production site, a manufacturing plant etc.) for performing various operations (e.g. inventory management, order picking, repair and maintenance etc.). In some example embodiments, various alerts indicating worker safety concerns can be generated on these electronic devices (102, 104). These alerts can be generated based on determining a distance between the electronic devices (102, 104) by using signal communication at ultrasonic frequency that can be performed by the electronic devices (102, 104). FIG. 5 illustrates an example of such a communication between the electronic devices (102, 104) involving exchange of signals at ultrasonic frequency.

The message flow diagram 500 illustrated in FIG. 5 depicts a sequence of messages and data communication that can happen between the first electronic device 102 and the second electronic device 104, according to some example embodiments. In some example embodiments, a finite set of process threads can be executed at each of the first electronic device 102 and the second electronic device 104 to perform an operation (e.g. generation of alerts indicative of worker safety). Further, the message flow diagram 500 also represents a finite sequence of events for each process thread that can be executed by a processing unit (e.g. the processing unit 150) of the respective device. Illustratively, a process thread that can be executed at the first electronic device 102 is represented by vertical line 502 and a process thread that can be executed at the second electronic device 104 is represented by vertical line 504. Further, horizontal lines in the message flow diagram 500 represents a communication (i.e. a message) communicated between the first electronic 102 and the second electronic device 104 and/or a data handled at the respective electronic device.

Illustratively, at step 506, the first electronic device 102 can send a BLE connection request to the second electronic device 104. The BLE connection request can correspond to a request for initiating an establishment of connection over BLE network between the first electronic device 102 and the second electronic device 104. In an example embodiment, the BLE connection request can be transmitted via the communications circuit 160 of the first electronic device 104, in response to, an initiation of a BLE discovery phase of BLE based connection at the first electronic device 102. Further, the BLE connection request may be advertised or broadcasted by the first electronic device 102 to seek a BLE based connection with other electronic devices that may be within a BLE communication range of the first electronic device 102. According to an example, the BLE connection request may include for example, but not limited to, a device identifier, a universal unique identifier (UUID), a service set identifier (SSID) etc., associated with the first electronic device 102.

In response to transmitting the BLE connection request, the first electronic device 102, 'may' or 'may not' receive a response to the BLE connection request. For instance, a response to the connection request may be received at the first electronic device 102, if another electronic device (e.g. the second electronic device 104) is located within a BLE communication range of the first electronic device 102. Alternatively, no response to the connection request may be received at the first electronic device 102 i.e. if no other electronic device is available within the BLE communication range of the first electronic device 102. Illustratively, at step 508, the first electronic device 102 may receive a BLE connection response from the second electronic device 104. The BLE connection response can be indicative of an acknowledgement or affirmation from the second electronic device 104 to establish a connection between the first electronic device 102 and the second electronic device 104, over BLE based communication network. In this regard, the second electronic device 104 can operate in a scanning phase and listen for any incoming BLE connection requests (i.e. advertisement signals) and respond with an acknowledgement (i.e. BLE connection response). Accordingly, the first electronic device 102 can listen for any incoming BLE connection responses as a response to the BLE connection request. It may be understood that setting up the BLE based connection establishment between the electronic devices (102, 104) may include additional steps between steps 506 and 508 (e.g. steps corresponding to various phases such as, 'scanning', 'discovery', 'connecting', 'initiating', 'synchronizing', and 'connection' known for standard BLE based connection set-up) which are not shown herein, for purpose of brevity.

As illustrated, the steps 506 and 508 (i.e. BLE based communication) can be optional. Said differently, according to an example embodiment, communication between the electronic devices (102, 104) can involve a BLE based connection establishment as illustrated at steps 506 and 508 followed by generation and exchange of non-audible signals at ultrasound frequency. Alternatively, according to another example embodiment, communication between the electronic devices (102, 104) can involve generation and exchange of non-audible signals at ultrasound frequency without performing any BLE based connection establishment. Further, in some example embodiments, generation and exchange of signals at ultrasound frequency can be based on occurrence of any event (e.g. pressing of a trigger button on any of the electronic devices 102, 104 etc.). In some example embodiments, generation and exchange of signals at ultrasound frequency between the electronic devices (102, 104) can be independent of any event.

At steps 510 and 512, non-audible signals at ultrasound frequency can be generated by the first electronic device 102 and the second electronic device 104, respectively. The non-audible signals at ultrasound frequency can be generated at the electronic devices (102, 104), in a similar manner, as described earlier in reference to FIGS. 1-4. For instance, the first speaker 204 of the first electronic device 102 can generate a first signal at a first ultrasound frequency. Further, the second speaker 208 of the second electronic device 104 can generate a second signal at a second ultrasound frequency. As an example, the first signal and the second signal can be sound signals at a range within 18 kHz to 23 kHz, or specifically at a range within 19 kHz to 21 kHz, or more specifically at 20 kHz. In an example embodiment, the first ultrasound frequency can be same as the second ultrasound frequency. Further, in some example embodiments, a range of ultrasound frequency at which the generation and exchange of non-audible signals can happen between the electronic devices (102, 104) can be predefined and known to the electronic devices (102, 104). For instance, the first ultrasound frequency and the second ultrasound frequency can be defined according to device configuration settings according to which speakers of the electronic devices (102, 104) can be pre-configured by an OEM.

As illustrated, at step 514, the first electronic device 102 can transmit, via the communications circuit 160, the first signal to the second electronic device 104. Furthermore, at step 516, the second electronic device 104 can transmit, via a respective communication circuit, the second signal to the first electronic device 102.

In accordance with some example embodiments, the first electronic device 102 can record (a) a first time value indicative of a time of transmitting the first signal and (b) a second time value indicative of a time of receiving of the second signal at the first electronic device 102. Similarly, the second electronic device 104 can record (e.g. store in a respective memory location): (a) a third time value indicative of a time of receiving of the first signal at the second electronic device 104 and (b) a fourth time value indicative of a time of transmitting the second signal. Accordingly, as illustrated, at step 518, the first electronic device 102 can record the first time value and the second time value as, a first timing information. Furthermore, at step 520, the second electronic device 104 can record the third time value and the fourth time value as, a second timing information. Although not illustrated for purpose of brevity, in accordance with some example embodiments, there can be an exchange of a plurality of signals (i.e. not limited to two signals) at ultrasound frequency between the first electronic device 102 and the second electronic device 104. Accordingly, timing information corresponding to sending and receiving of the plurality of signals, at respective electronic devices (102, 104), can be recorded.

According to some example embodiments, the timing information related to exchange of signals at ultrasound frequency can be shared between the electronic devices (102, 104). For instance, as illustrated, at step 522, the first electronic device 102 can send the first timing information to the second electronic device 104. Further, as illustrated at step 524, the second electronic device can send the second timing information to the first electronic device 102. In some example embodiments, the first electronic device 102 and the second electronic device 104 may utilize the BLE based connection to share the timing information to each other. Alternatively, and/or additionally, in some example embodiments, the first electronic device 102 and/or the second electronic device 104 can utilize any communication network 103, as described in reference to FIG. 1, for sharing the timing information between each other.

At step 526, at the first electronic device 102, a distance between the first electronic device 102 and the second electronic device 104 can be computed by utilizing the timing information corresponding to exchange of signals at ultrasound frequency between the electronic devices (102, 104). In this regard, initially a first distance value between the first electronic device 102 and the second electronic device 104 can be computed by performing a time of flight estimation using the first timing information and the second timing information. Further, a second distance value can be determined from the first distance value. The second distance value can be determined by refining the first distance value according to an output of a machine learning model, details of which are earlier described in reference to FIG. 4. In this aspect, the second distance value may provide a relatively accurate estimation of the distance between the electronic devices (102, 104) compared to the first distance value.

At step 528, the first electronic device 102 can generate an alert. The alert can be generated based on comparison of the second distance value with a pre-defined threshold value. In some examples, the predefined threshold value can correspond to a threshold distance that may be defined according to a physical distancing norm for an environment. Further, the alert can be generated, by the first electronic device 102, if the second distance value is less than or equal to the pre-defined threshold value. As an example, the predefined threshold value can be 4 feet. In this regard, an alert can be generated if the second distance value computed between the two electronic devices is less than or equal to 4 feet.

Various types of alerts can be generated by the first electronic device 102, according to embodiments described herein. For instance, in an example, generation of the alert on the first electronic device 102 can include ringing an alarm on the first electronic device 102. In another example, generation of the alert can include displaying an indication on a first display screen of the first electronic device 102. In yet another example, generation of alert can include generating a haptic feedback and/or by activating a flashlight on the first electronic device 102.

According to some example embodiments, the first electronic device 102 can also cause to generate an alert on the second electronic device 104. For instance, as illustrated at step 530, the first electronic device 102 can send an alert command to the second electronic device 104 that can trigger generation of alert at the second electronic device 104. As illustrated, at step 532, in response to receiving of the alert command, an alert can be generated at the second electronic device 104. In an example embodiment, the first electronic device 102 can send a first alert command that can cause ringing of an alarm at the second electronic device 104. In another example embodiment, the first electronic device 102 can send a second alert command that can cause displaying of an indication on a display screen of the second electronic device 104. In yet another example embodiment, the first electronic device 102 may send a third alert command to the second electronic device 104 that can cause generation of a haptic feedback on the second electronic device 104. In another example embodiment, the first electronic device 102 can send a fourth alert command that can cause activation of a second flashlight of the second electronic device 104. Further details of generation of alert at the electronic devices (102, 104) are described in method flowcharts as described in reference to FIGS. 9-11.

Figure 6:
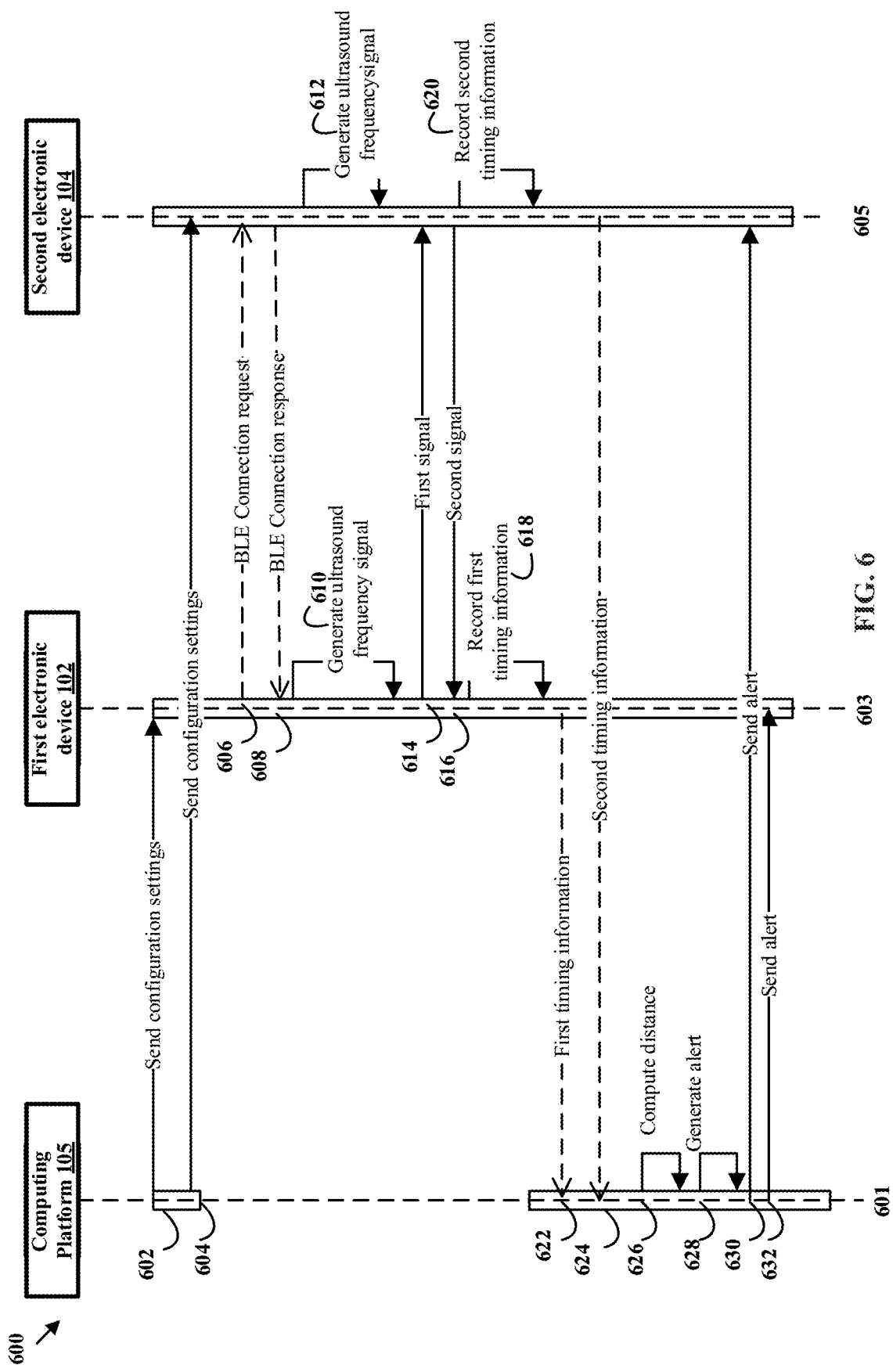
FIG. 6 illustrates another message flow diagram depicting communication amongst a server, a first electronic device, and a second electronic device, in accordance with some example embodiments described herein.

Some example embodiments described herein can be implemented, in an example scenario, in which one or more operations of the electronic devices (102, 104) can be managed by the computing platform 105 (e.g. a master device or a server). For instance, in some example embodiments, computation of distance between the electronic devices (102, 104) and generation of alerts can be managed by the computing platform 105. FIG. 6 illustrates another message flow diagram 600 depicting an example communication amongst, the computing platform 105, the first electronic device 102, and the second electronic device 104, in accordance with some example embodiments described herein.

In some examples, the electronic devices (102, 104) and the computing platform 105 can be provisioned in a work environment (e.g. a warehouse, an inventory, or any other industrial environment). For instance, as described earlier, the electronic devices (102, 104) can be used by workers to increase worker's productivity while performing various operations (like, but not limited to, package positioning, refilling shelves, stocking inventory, shipment processing etc.) in the work environment. In such cases, workflows comprising steps of a task can be executed in form of visual instructions and/or can be provided to the workers in form of audio or visual instructions on the electronic devices (102, 104). In some example embodiments, these workflow can be provisioned by the computing platform 105 on the electronic devices (102, 104). Accordingly, the workers may receive instructions for performing various operations within the inventory on the electronic devices (102, 104) in form of audio and/or visual instructions, to which the worker can respond using a respective input/output circuit, as described in reference to FIG. 1. Further, data pertaining of execution of tasks can be communicated back to the computing platform 105 from the electronic devices (102, 104). Furthermore, the computing platform 105 can perform management and execution of various activities performed by the electronic devices (102, 104).

In some example embodiments, the computing platform 105 can correspond to a master device that may comprise substantially more resources (e.g. memory, battery life, network connectivity, etc.) as compared to resources of the electronic devices (102, 104). In an example scenario, the computing platform 105 can operate as a central server that may be administered by an administrator (e.g. workforce manager) and the electronic devices (102, 104) can be used by the workers.

The message flow diagram 600 illustrated in FIG. 6 depicts a sequence of messages and data communication that can happen amongst, the computing platform 105, the first electronic device 102, and the second electronic device 104, respectively according to some example embodiments. In some example embodiments, a finite set of process threads can be executed at each of the computing platform 105, the first electronic device 102, and the second electronic device 104 respectively, to perform an operation (e.g. generation of alerts indicative of worker safety). Further, the message flow diagram 600 also represents a finite sequence of events for each process thread that can be executed by a processing unit (e.g. the processing unit 150, 170) of the respective device. Illustratively, a process thread that can be executed at the computing platform 105 is represented by a vertical line 601, a process thread that can be executed at the first electronic device 102 is represented by another vertical line 603, and a process thread that can be executed at the second electronic device 104 is represented by another vertical line 605. Further, horizontal lines in the message flow diagram 600 represents a communication (i.e. a message) communicated amongst, the computing platform 105, the first electronic device 102 and the second electronic device 104 and/or a data handled at the respective device.

Illustratively, at step 602, the computing platform 105 can send configuration settings to the first electronic device 102.

Further, at step 604, the computing platform 105 can send configuration settings to the second electronic device 104. In an example embodiment, the configuration settings can include an information indicative of a range of ultrasound frequency that can be used for communication between the first electronic device 102 and the second electronic device 104. Additionally, and/or alternatively, in another example embodiment the configuration setting can include information indicating a 'start time' and an 'end time' for exchanging signals at the ultrasound frequency by the first electronic device 102 and the second electronic device 104. As described earlier, in some examples, an ultrasound frequency range, at which the electronic devices (102, 104) can communicate with each other, can be selected based on a user input. In this regard, in some example embodiments, the configuration settings can also include information indicating user-defined frequency range for exchanging signals at ultrasound frequency between the electronic devices (102, 104). Accordingly, the first electronic device 102 and the second electronic device 104 can receive device configuration settings from the computing platform 105. In some example embodiments, the configuration settings can also include other information such as, user credentials, custom settings for worker, etc.

Similar to as described earlier in reference to FIG. 5, according to some example embodiments, the electronic devices (102, 104) can optionally establish a BLE based connection before initiating an exchange of signals at ultrasound frequency. As illustrated at step 606, the first electronic device 102 can send a BLE connection request to the second electronic device 104. The BLE connection request can correspond to a request for initiating an establishment of connection over BLE network between the first electronic device 102 and the second electronic device 104.

In response to broadcasting the connection request, the first electronic device 102 'may' or 'may not' receive a response to the connection request. For instance, a response to the connection request may be received at the first electronic device 102 from another electronic device (e.g. the second electronic device 104), if it is located within a BLE communication range of the first electronic device 102. Alternatively, no response to the connection request may be received at the first electronic device 102, if no other electronic device is available within the BLE communication range of the first electronic device 102. As illustrated at step 608, the first electronic device 102 can receive a BLE connection response from the second electronic device 104 to establish a connection between the first electronic device 102 and the second electronic device 104, over BLE based communication network.

Further, as illustrated at steps 610 and 612, signals at ultrasound frequency can be generated by the first electronic device 102 and the second electronic device 104, respectively. For instance, at step 610, the first speaker 204 of the first electronic device 102 can generate a first signal at a first ultrasound frequency. Further, at step 612, the second speaker 208 of the second electronic device 104 can generate a second signal at a second ultrasound frequency. As illustrated, at step 614, the first electronic device 102 can transmit the first signal to the second electronic device 104 and at step 516, the second electronic device 104 can transmit the second signal to the first electronic device 102. Although FIG. 6 illustrates an exchange of two signals (i.e. the first signal and the second signal) at ultrasound frequency, however, it can be understood that a plurality of non-audible signals at ultrasound frequency can be generated and exchanged between the electronic devices (102, 104).

In an example embodiment, generation of the signals at ultrasound frequency can performed at a time interval that can be defined in accordance with the configuration settings received from the computing platform 105. In other words, the signals at ultrasound frequency can be generated and exchanged between the electronic devices (102, 104) according to the 'start time' defined in the configuration settings. Further, generation and exchange of the signals at ultrasound frequency can be stopped according to the 'end time' defined in configuration settings. In some examples, the start time and stop time can be user defined. In some examples, the start time and the stop time can be defined by the computing platform 105 according to a usage history (e.g. working shift hours) of the electronic device (102, 104).

As described earlier in reference to FIG. 5, the electronic devices (102, 104) can record timing information related to exchange of signals at ultrasound frequency. For instance, in an example embodiment, the first electronic device 102 can record (a) a first time value indicative of a time of transmitting the first signal and (b) a second time value indicative of a time of receiving of the second signal. Similarly, the second electronic device 104 can record (e.g. store in a respective memory location): (a) a third time value indicative of a time of receiving of the first signal and (b) a fourth time value indicative of a time of transmitting the second signal. Accordingly, as illustrated, at step 618, the first electronic device 102 can record the first time value and the second time value as, a first timing information. Furthermore, at step 620, the second electronic device 104 can record the third time value and the fourth time value as, a second timing information. According to some example embodiments, the timing information recorded at a respective electronic device can be shared with the computing platform 105. For instance, as illustrated, at step 622, the computing platform 105 can receive the first timing information from the first electronic device 102. Further, as illustrated at step 624, the computing platform 105 can receive the second timing information from the second electronic device 104. In this regard, in an example embodiment, the computing platform 105 can receive the timing information in near real time. In another example embodiment, the computing platform 105 can periodically poll the electronic devices (102, 104) for sharing the timing information.

At step 626, a distance between the first electronic device 102 and the second electronic device 104 can be computed at the computing platform 105. As described earlier in reference to FIGS. 1-5, initially a first distance between the first electronic device 102 and the second electronic device 104 can be computed, i.e. by performing a time of flight-based estimation by utilizing the timing information. Further, a second distance value can be determined from the first distance. As described earlier in reference to FIG. 4, the second distance value can be determined by refining the first distance value by using an output of the machine learning model employed by the machine learning engine 402.

Further, at step 628, the computing platform 105 can generate an alert based on comparison of the second distance value with a pre-defined threshold value. The predefined threshold value can correspond to a distance value that may be defined according to a physical distancing norm for an environment. According to some examples, the alert can be indicative of a safety concern for the workers. For instance, in an example, the alert can be indicative of violation of a social distancing (i.e. physical distancing) norm between two workers. As illustrated at steps 630 and 632, the computing platform 105 can send alerts to the first electronic device 102 and the second electronic device 104, respectively. As described earlier in reference to FIG. 5, various types of alerts can be generated. For instance, in an example, the computing platform 105 can send an alert command to the first electronic device 102 and/or the second electronic device 104 that can cause for example, but not limited to, ringing an alarm on at least one of the first electronic device 102 and/or the second electronic device 104, generating a haptic feedback (e.g. vibration) on at least one of the first electronic device 102 and/or the second electronic device 104, displaying a safety guideline on at least one of the first electronic device 102 and/or the second electronic device 104, etc.

Figure 7:
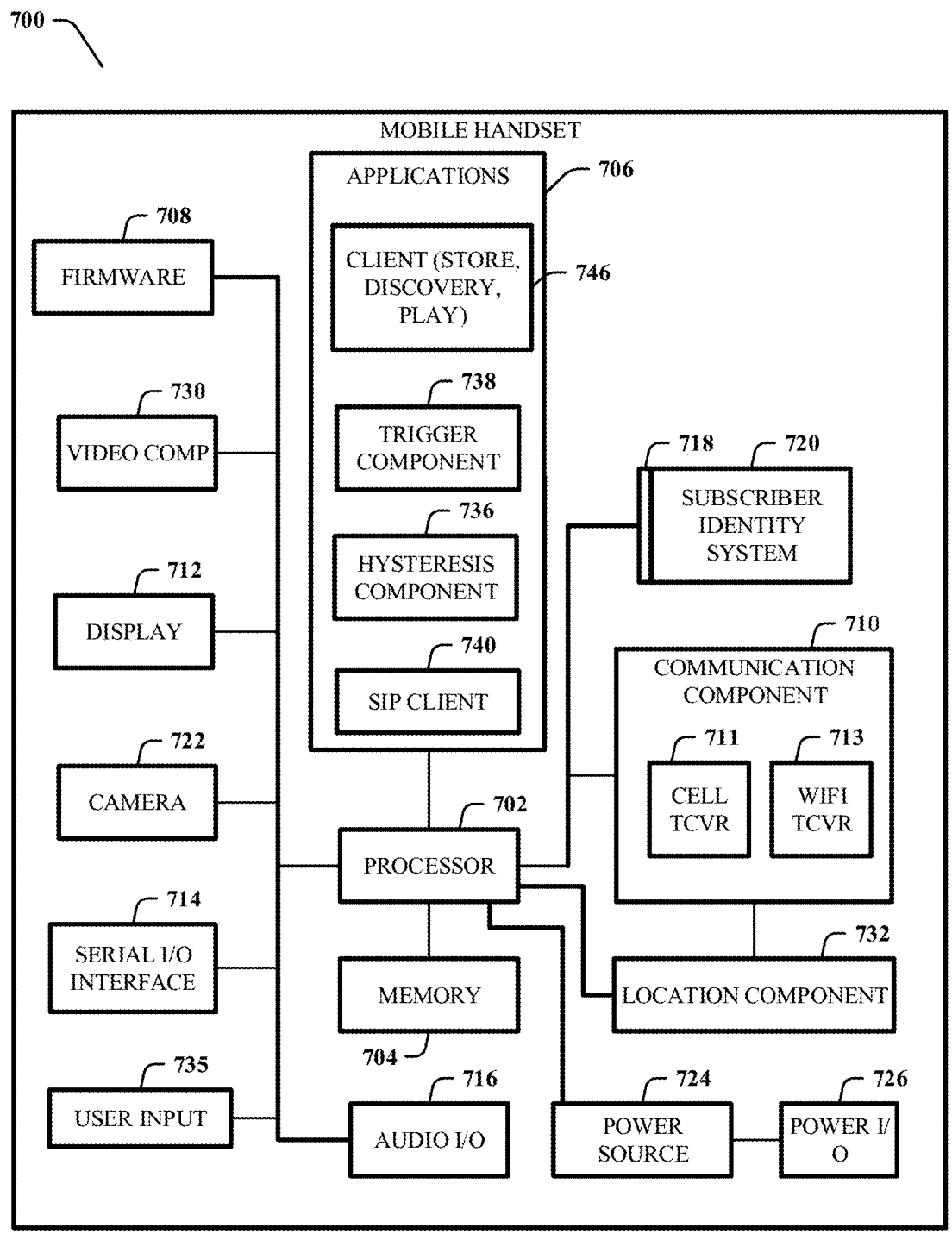
FIG. 7 illustrates a schematic view of an example electronic device, in accordance with an example embodiment described herein.

FIG. 7 illustrates a schematic view 700 of an example electronic device (e.g. of the plurality of electronic devices 102-10N), in accordance with an example embodiment described herein. In some example embodiments, the first electronic device 102 and/or the second electronic device 104 can correspond to a mobile handset. FIG. 7 illustrates is a schematic block diagram of an example end-user device such as a user equipment that can be the first electronic device 102 and/or the second electronic device 104 that can be capable of generating alerts, as described in reference to FIGS. 1-6. To this end, according to some example embodiments, the electronic device illustrated in FIG. 7 can be capable of generating alerts based on determining a refined distance value and comparing it with the pre-defined threshold, thereby, indicating a violation of physical distancing norms to be maintained in an environment.

Although, FIG. 7 illustrates a mobile handset, it will be understood that other devices can be any electronic device as described in FIG. 1, and that the mobile handset is merely illustrated to provide context for the embodiments of the various embodiments described herein. To this end, the following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., described herein in accordance with example embodiments, that can perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

According to some example embodiments, the plurality of electronic devices (102-10N) can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

According to some example embodiments described herein, a communication media typically embodies computer-readable instructions, data structures, program modules or other data in a modulated data signal such as a carrier wave or other transport mechanism and includes any information delivery media. In this regard, the term "modulated data signal" can correspond to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

According to some example embodiments, the mobile handset can comprise a processor 702 for controlling and processing all onboard operations and functions. A memory 704 interfaces to the processor 702 for storage of data and one or more applications 706 (e.g., a video player software, user feedback component software, etc.). Other applications can include voice recognition of predetermined voice commands that facilitate initiation of the user feedback signals. The applications 706 can be stored in the memory 704 and/or in a firmware 708 and executed by the processor 702 from either or both the memory 704 or/and the firmware 708. The firmware 708 can also store startup code for execution in initializing the mobile handset. A communications component 710 interfaces to the processor 702 to facilitate wired/wireless communication with external systems, e.g., cellular networks, VoIP networks, and so on. Here, the communications component 710 can also include a suitable cellular transceiver 711 (e.g., a GSM transceiver) and/or an unlicensed transceiver 713 (e.g., Wi-Fi, WiMAX) for corresponding signal communications. The mobile handset can be a device such as a cellular telephone, a PDA with mobile communications capabilities, and messaging-centric devices. The communications component 710 also facilitates communications reception from terrestrial radio networks (e.g., broadcast), digital satellite radio networks, and Internet-based radio services networks.

The mobile handset can also comprise a display 712 (e.g. display screen) for displaying text, images, video, telephony functions (e.g., a Caller ID function), setup functions, and for user input. For example, the display 712 can also be referred to as a "screen" that can accommodate the presentation of multimedia content (e.g., music metadata, messages, wallpaper, graphics, etc.). The display 712 can also display videos and can facilitate the generation, editing and sharing of video quotes. A serial I/O interface 714 is provided in communication with the processor 702 to facilitate wired and/or wireless serial communications (e.g., USB, and/or IEEE 1384) through a hardwire connection, and other serial input devices (e.g., a keyboard, keypad, and mouse). This support updating and troubleshooting the mobile handset, for example. Audio capabilities are provided with an audio I/O component 716, which can include a speaker for the output of audio signals related to, for example, indication that the user pressed the proper key or key combination to initiate the user feedback signal. The audio I/O component 716 also facilitates the input of audio signals through a microphone to record data and/or telephony voice data, and for inputting voice signals for telephone conversations.

The mobile handset can also comprise a slot interface 718 for accommodating a SIC (Subscriber Identity Component) in the form factor of a card Subscriber Identity Module (SIM) or universal SIM 720 and interfacing the SIM card 720 with the processor 702. However, it is to be appreciated that the SIM card 720 can be manufactured into the mobile handset and updated by downloading data and software.

The mobile handset can also process IP data traffic through the communication component 710 to accommodate IP traffic from an IP network such as, for example, the Internet, a corporate intranet, a home network, a person area network, etc., through an ISP or broadband cable provider. Thus, VoIP traffic can be utilized by the mobile handset and IP-based multimedia content can be received in either an encoded or decoded format.

A video processing component 722 (e.g., a camera) can be provided for decoding encoded multimedia content. The video processing component 822 can aid in facilitating the generation, editing and sharing of video quotes. The mobile handset also includes a power source 724 in the form of batteries and/or an AC power subsystem, which power source 724 can interface to an external power system or charging equipment (not shown) by a power I/O component 726.

According to some example embodiments, the mobile handset can also comprise a video component 730 for processing video content received and, for recording and transmitting video content. For example, the video component 730 can facilitate the generation, editing and sharing of video quotes. In some example embodiments, a location tracking component 732 facilitates geographically locating the mobile handset. As described hereinabove, this can occur when the user initiates the feedback signal automatically or manually. According to some example embodiments, a user input component 734 facilitates the user initiating the quality feedback signal. In this regard, in some examples, the user input component 734 can also facilitate the generation, editing and sharing of video quotes. According to various example embodiments described herein, the user input component 734 can include such conventional input device technologies such as a keypad, keyboard, mouse, stylus pen, and/or touch screen, for example.

Referring again to the applications 706, a hysteresis component 736 can facilitate the analysis and processing of hysteresis data, which is utilized to determine when to associate with the access point. A software trigger component 838 can be provided that facilitates triggering of the hysteresis component 738 when the Wi-Fi transceiver 713 detects the beacon of the access point. A SIP client 740 enables the mobile handset to support SIP protocols and register the subscriber with the SIP registrar server. In some example embodiments, the applications 706 can also include a client 742 that provides at least the capability of discovery, play and store of multimedia content, for example, music.

In some example embodiments, the mobile handset, as indicated above related to the communications component 710, includes an indoor network radio transceiver 713 (e.g., Wi-Fi transceiver). This function can support the indoor radio link, such as IEEE 802.11, for the dual-mode GSM handset. In some example embodiments, the mobile handset can accommodate at least satellite radio services through a handset that can combine wireless voice and digital radio chipsets into a single handheld device.

Figure 8:
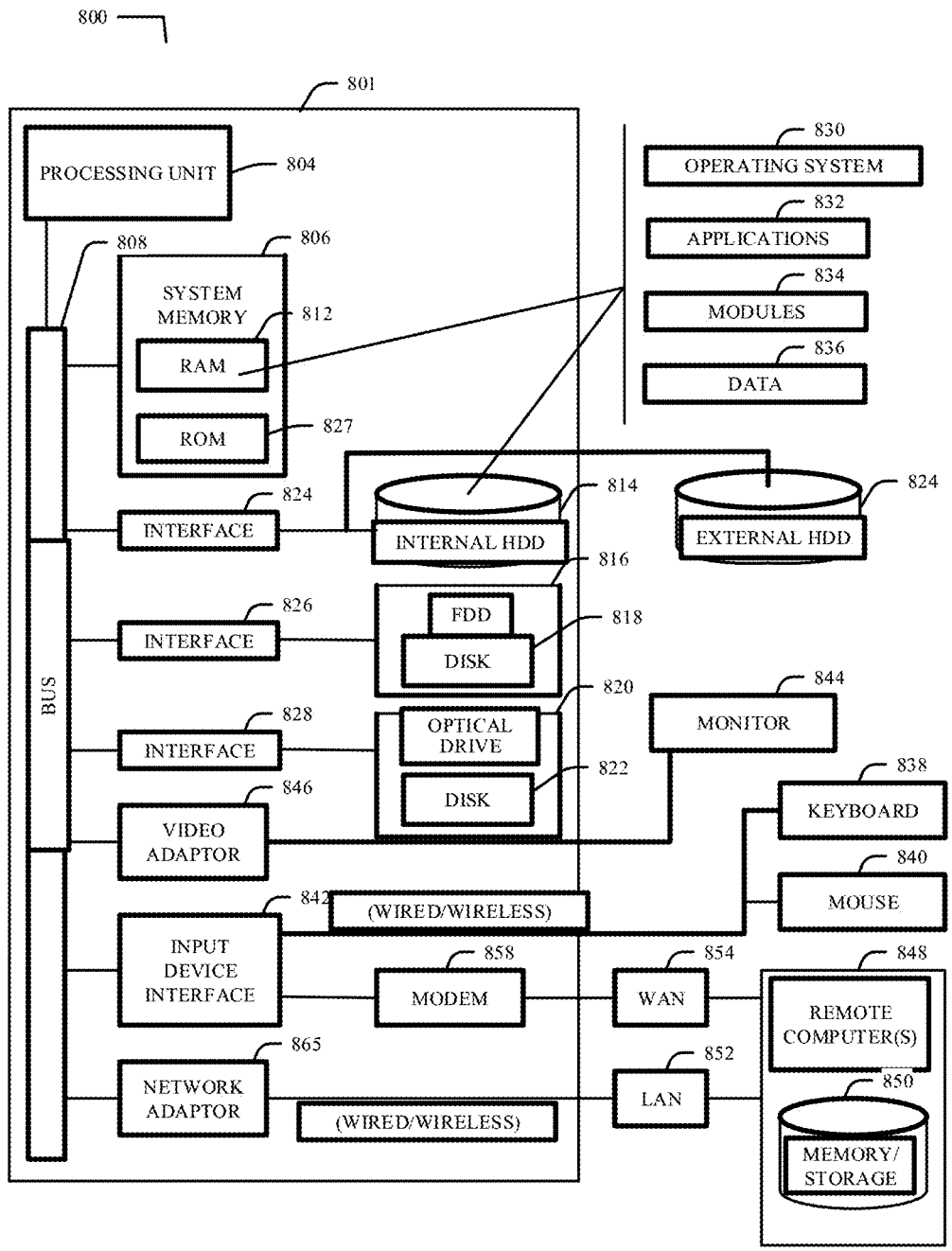
FIG. 8 illustrates a schematic view of an example electronic device, in accordance with another example embodiment described herein.

FIG. 8 illustrates a schematic view of another example of electronic device 801, in accordance with another example embodiment described herein. According to some example embodiments, the electronic device 801 illustrated in FIG. 8 can correspond to any electronic device of the plurality of electronic devices (102-10N), as described in reference to FIGS. 1-7. In some example embodiments, the electronic device illustrated in FIG. 8 can also correspond to the computing platform 105 as described in reference to FIGS. 1-7.

Referring now to FIG. 8, there is illustrated a block diagram of operable to execute the functions and operations performed in the described example embodiments. In some example embodiments, the electronic device 801 can provide networking and communication capabilities between a wired or wireless communication network and a server and/or communication device. In order to provide additional context for various aspects thereof, FIG. 8 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, mini-computers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 8, implementing various aspects described herein with regards to the end-user device can comprise the electronic device 801 comprising a processing unit 804, a system memory 806 and a system bus 808. The system bus 808 can be configured to couple system components including, but not limited to, the system memory 806 to the processing unit 804. In some example embodiments, the processing unit 804 can be any of various commercially available processors. To this end, in some examples, dual microprocessors and other multi-processor architectures can also be employed as the processing unit 804.

According to some example embodiments, the system bus 808 can be any of several types of bus structure that can further interconnect to a memory bus (with or without a memory controller), a peripheral bus, and a local bus using any of a variety of commercially available bus architectures. In some examples, the system memory 806 can comprise, read-only memory (ROM) 827 and random-access memory (RAM) 812. According to some example embodiments, a basic input/output system (BIOS) is stored in a non-volatile memory 827 such as ROM, EPROM, EEPROM, which BIOS contains the basic routines that help to transfer information between elements within the computing device 801, such as during start-up. The RAM 812 can also comprise a high-speed RAM such as static RAM for caching data.

According to some example embodiments, the computing device 801 can further comprise an internal hard disk drive (HDD) 814 (e.g., EIDE, SATA), which internal hard disk drive 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). In some examples, the hard disk drive 814, magnetic disk drive 816 and optical disk drive 820 can be connected to the system bus 808 by a hard disk drive interface 824, a magnetic disk drive interface 826 and an optical drive interface 828, respectively. According to some example implementations, the interface 824 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the electronic device 801 the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by an electronic device 801, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 812, including an operating system 830, one or more application programs 832, other program modules 834 and program data 836. To this end, in some examples, all or portions of the operating system, applications, modules, and/or data can also be cached in the RAM 812. It is to be appreciated that the various embodiments can be implemented with various commercially available operating systems or combinations of operating systems.

According to some example embodiments, a user can enter commands and information into the computing device 801 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. In some examples, these and other input devices are often connected to the processing unit 804 through an input device interface 842 that is coupled to the system bus 808, but can be connected by other interfaces, such as a parallel port, an IEEE 1384 serial port, a game port, a USB port, an IR interface, etc.

According to some example embodiments, a monitor 844 or other type of display device can also be connected to the system bus 808 through an interface, such as a video adapter 846. In addition to the monitor 844, the computing device 801 can also comprise other peripheral output devices (not shown), such as speakers, printers, etc.

According to some example embodiments, the computing device 801 can operate in a networked environment using logical connections by wired and/or wireless communications to one or more remote computers, such as a remote computer(s) 848. In some examples, the remote computer(s) 848 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 850 is illustrated. According to some example embodiments, the logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the computing device 801 can be connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

In alternate examples, when used in a WAN networking environment, the computing device 801 can include a modem 858, or can be connected to a communications server on the WAN 854 or has other means for establishing communications over the WAN 854, such as by way of the Internet. The modem 858, which can be internal or external and a wired or wireless device, is connected to the system bus 808 through the input device interface 842. In a networked environment, program modules depicted relative to the computer, or portions thereof, can be stored in the remote memory/storage device 850. It will be appreciated that the network connections shown are exemplary and other means of establishing a communications link between the computers can be used.

According to some example embodiments, the computing device 801 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. Further, in accordance with some example embodiments described herein, a Wi-Fi network can be used to connect computers or the plurality of electronic devices 102-10N to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "9BaseT" wired Ethernet networks used in many offices.

Figure 9:
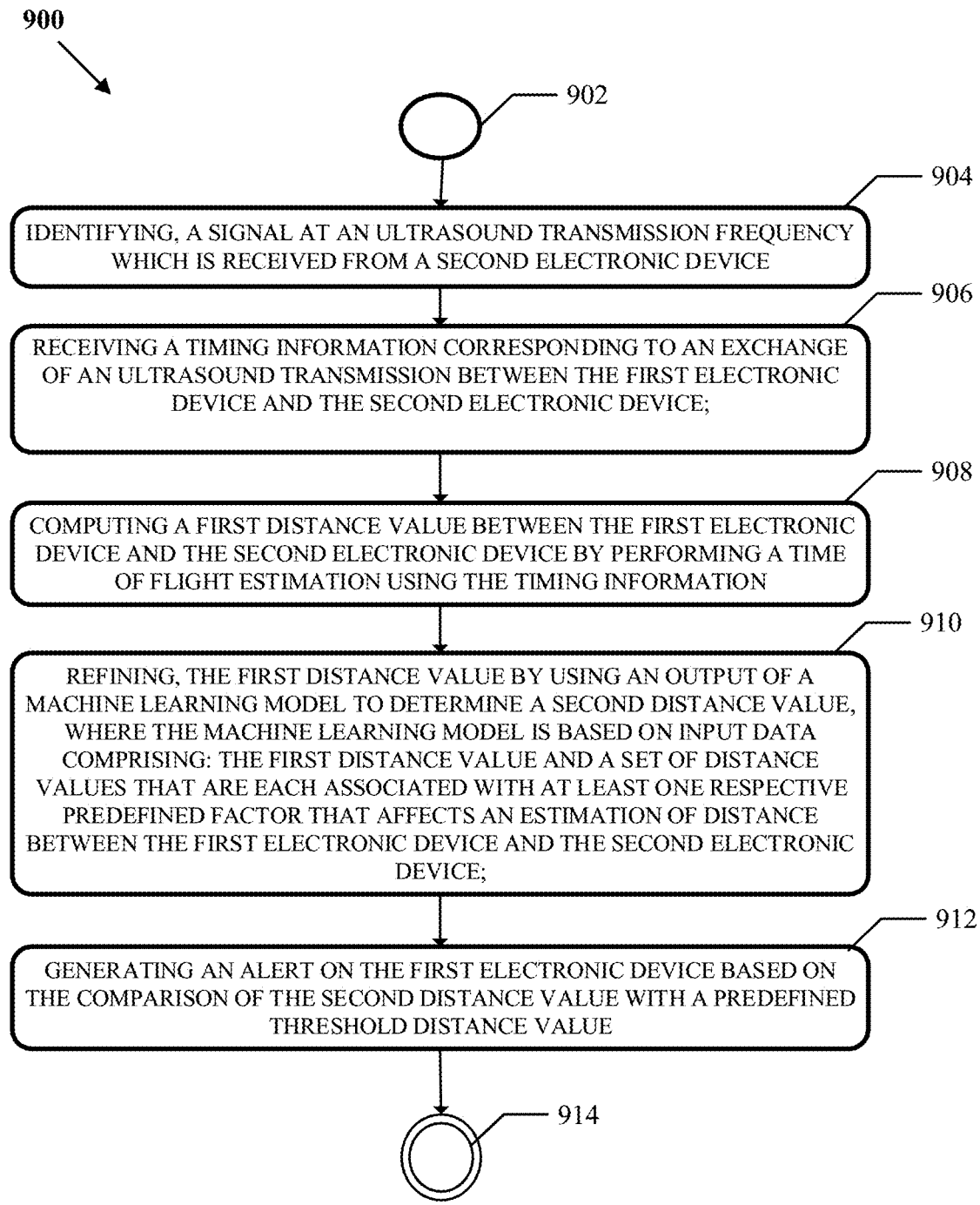
FIG. 9 illustrates a flow diagram representing a method for alerting a user of an electronic device, in accordance with an example embodiment described herein.
Figure 10:
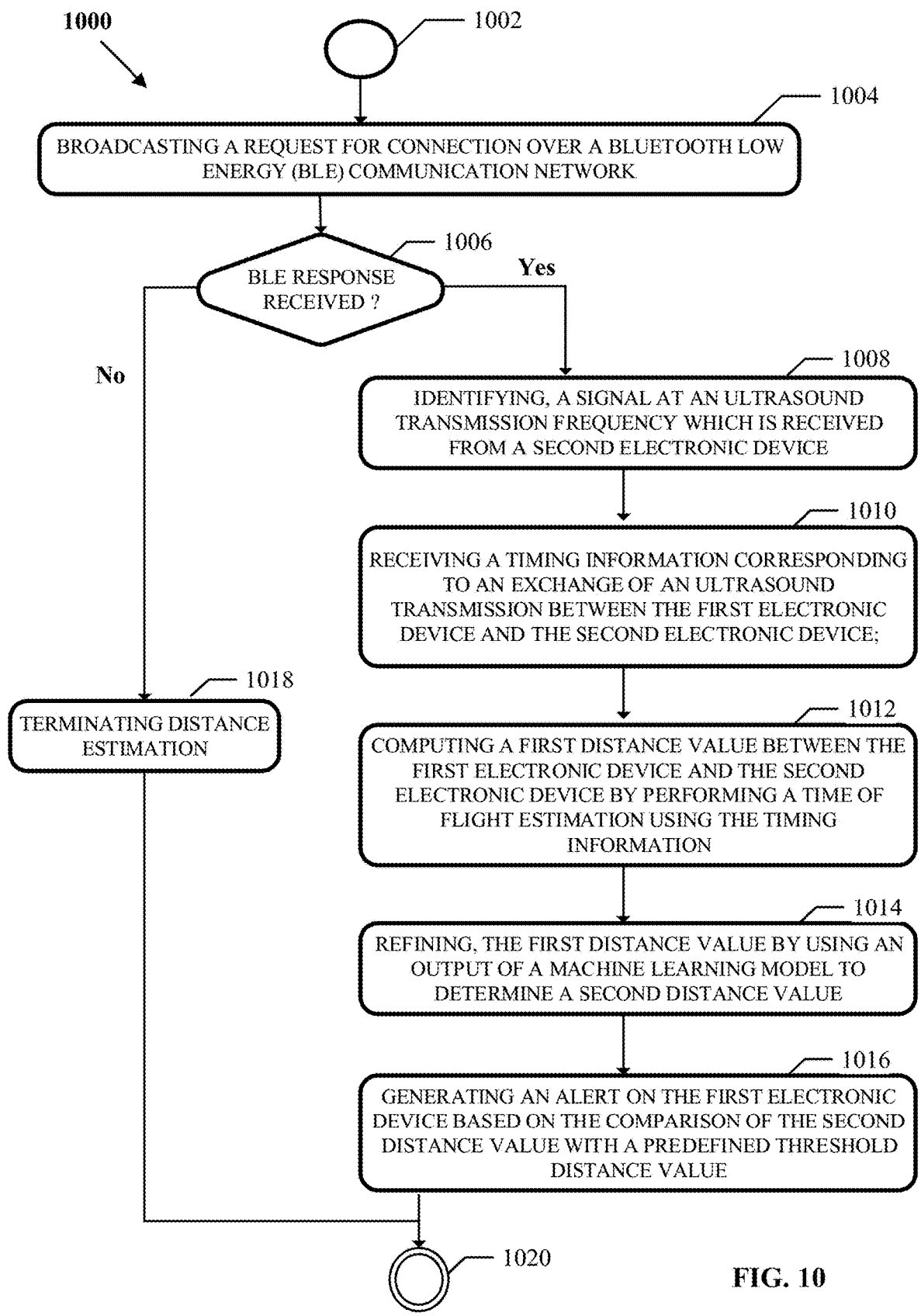
FIG. 10 illustrates a flow chart representing a method for establishing a communication between a first electronic device and a second electronic device based on exchange of signals at ultrasound frequency range, in accordance with another example embodiment described herein.
Figure 11:
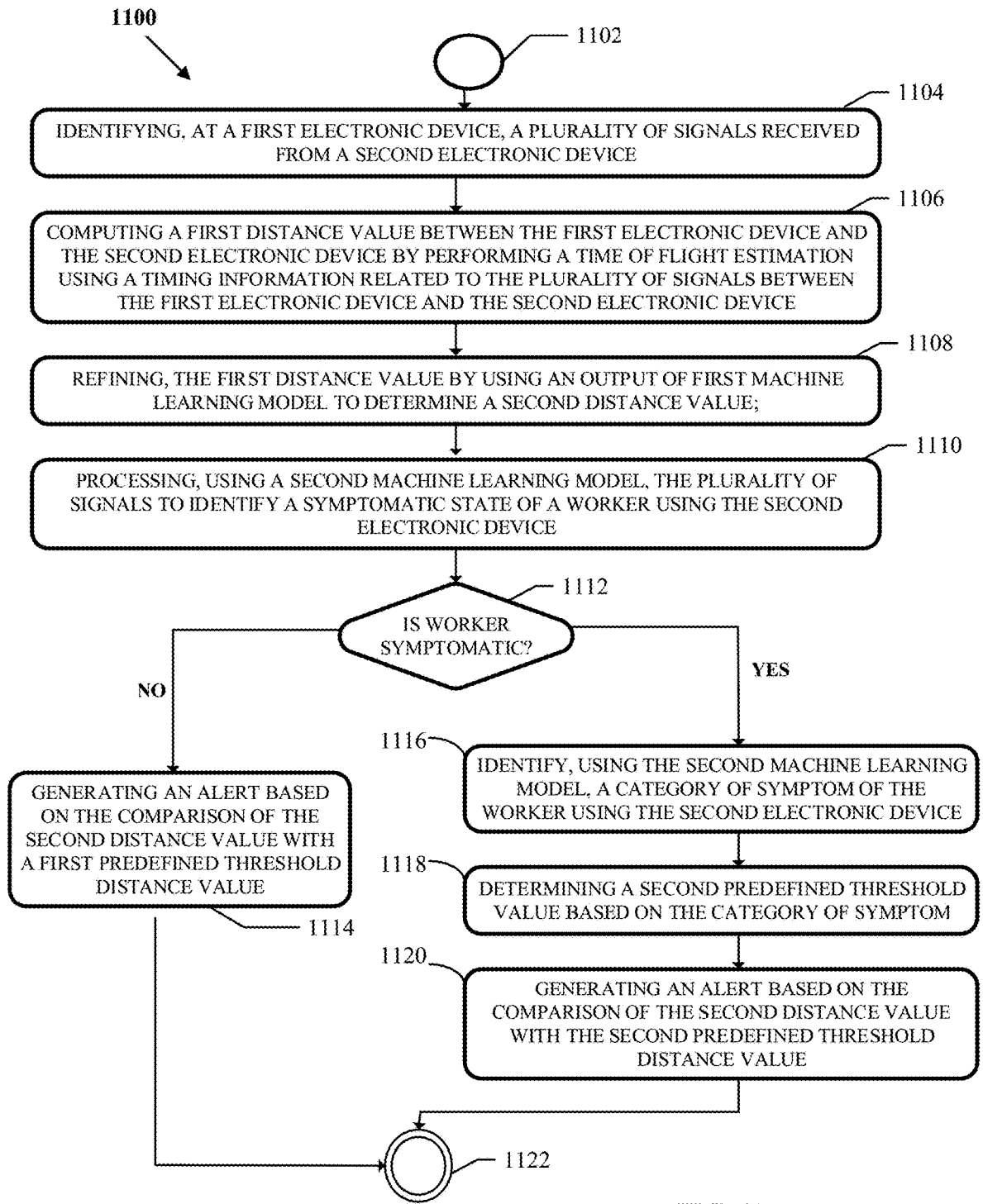
FIG. 11 illustrates a flow diagram representing a method for alerting a user of an electronic device according to a symptomatic state of another user, in accordance with an example embodiment described herein

FIGS. 9 through 11 illustrate, example flowcharts of the operations performed by an apparatus, such as the plurality of electronic devices (102 . . . 10N) and/or the computing platform 105, as described in FIGS. 1-8, according to some example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for the implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 9 through 11, when executed, convert the computer or processing circuitry into a particular machine configured to perform an example embodiment of the present invention. Accordingly, the operations of FIGS. 10 through 11 can define an algorithm for configuring a computer or processor, to perform an example embodiment. In some cases, a general-purpose computer may be provided with an instance of the processor which performs the algorithm of FIGS. 9 through 11 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

FIG. 9 illustrates a flow diagram representing a method 900 for alerting a user of an electronic device (902, 904), in accordance with an example embodiment described herein. Illustratively, the method 900 starts at step 902. At step 904, the first electronic device 102 may include means such as, the first microphone (154, 202) to identify a signal at an ultrasound frequency. In some examples, the signal may be transmitted from the second electronic device 104 and may be received by the communications circuit 160 of the first electronic device 102. For instance, as described earlier in reference to FIGS. 2-6, the first microphone 202 may receive the second signal 216 transmitted from the second electronic device 104.

At step 906, the first electronic device 102 may include means such as, the communications circuit 154 that may receive timing information corresponding to an exchange of ultrasound transmission between the first electronic device 102 and the second electronic device 104. The exchange of ultrasound transmission can correspond to exchange of signals at ultrasound frequency between the first electronic device 102 and the second electronic device 104, respectively. In other words, the timing information can correspond to a time period and/or individual instances of time, related to sending and/or receiving of ultrasound frequency signals at respective electronic devices (102, 104). As an example, referring back to FIGS. 2-6, the timing information may include data values of timings at which: (a) the first signal 214 is transmitted by the first electronic device 102, (b) the first signal is received at the second electronic device 104, (c) the second signal 216 is transmitted by the second electronic device 104, and (d) the second signal 216 is received at the first electronic device 102.

In one example embodiment, the timing information can be shared between the first electronic device 102 and the second electronic device 104 based on the data communication between the electronic devices (102, 104). Various modes of data communication between the electronic devices (102, 104) can be possible. As an example, the timing information can be shared between the electronic devices (102, 104) by using the BLE based connection establishment (210, 212) as described earlier in reference to FIGS. 2-6. In another example, the timing information can be shared to the electronic devices (102, 104) by the computing platform 105. In this regard, in an example embodiment, the first electronic device 102 and the second electronic device 104 may periodically share the timing information to the computing platform 105. Further, in another example embodiment, the computing platform 105 may poll the electronic devices (102, 104) for the timing information. In yet another example embodiment, the timing information can be shared between the electronic devices (102, 104) by using the ultrasound frequency-based communication network.

Moving to step 908, the first electronic device 102 may include means such as, the processing unit 150 to compute a first distance value between the first electronic device 102 and the second electronic device 104. The first distance value can be computed by performing a time of flight estimation using the timing information. As an example, the processing unit 150 can compute the distance between the two electronic devices (102, 104) based on using (i) a speed of sound (i.e. ultrasonic wave) and (ii) a time period (i.e. a time interval between a first time at which the signal at ultrasound frequency is sent from a sender device and a second time at which the signal is received at a receiver device). Said differently, the processing unit 150 can compute the first distance between the electronic devices (102, 104) by using the time of flight (i.e. time taken by the signal at ultrasound frequency to travel from the sender device to the receiver device) and the speed of sound in an environment.

At step 910, the first electronic device 102 can include means such as, the processing unit 150 to refine the first distance. In this regard, refining the first distance can correspond to, for example, but not limited to, revising, modifying, updating, changing, correcting, and/or the like, the first value to a second distance value. The processing unit 150 can refine the first distance by using an output of a machine learning model (e.g. the machine learning model 402 as described in reference to FIG. 4). Accordingly, the processing unit 150 can determine the second distance value by refining the first distance value according to the output (e.g. a correction factor) by the machine learning model. According to some example embodiments, the machine learning model used for refining the first distance value can be defined based on input data that may include: (a) the first distance value and (b) a set of distance values. The set of distance values can correspond to sample data set of distance values that may be recorded according to at least one predefined factor.

As described earlier, a time of flight-based estimation of the distance between two electronic devices (102, 104) can be influenced based on various factors. In accordance with some example embodiments described herein, the at least one predefined factor can include such factors that can affect an estimation of the distance between the first electronic device 102 and the second electronic device 104. For example, in some example embodiments, the at least one predefined factor can include: (i) a temperature of a work environment, (ii) a usage history of at least one of the first electronic device and the second electronic device, (iii) an orientation data associated with at least one of the first electronic device 102 and the second electronic device 104, (iv) a device specification information associated with at least one of the first electronic device 102 and the second electronic device (104), and (v) a state of movement associated with at least one of the first electronic device 102 and the second electronic device 104.

At step 912, the first electronic device 102 can include means such as, the processing unit 150 to generate an alert based on a comparison of the second distance value with a predefined threshold value. The predefined threshold value can correspond to a distance value that may be defined according to a physical distancing norm for an environment. For example, the physical distancing norm can be to maintain at least 6 feet distance between two workers. In an example embodiment, the processing unit 150 can generate the alert, in an instance, if the second distance value is less than or equal to the pre-defined threshold value.

As described earlier in reference to FIGS. 1-8, various types of alerts can be generated. For instance, in an example embodiment, the processing unit 150 can generate the alert on the first electronic device 102 by ringing an alarm on the first electronic device 102. According to another example embodiment, the processing unit 150 can generate the alert based on other means e.g. by generating a haptic feedback on the first electronic device 102 and/or by activating a first flashlight of the first electronic device 102.

According to an example embodiment, the processing unit 150 can generate the alert by displaying an indication on a first display screen of the first electronic device 102. In this regard, in an example embodiment, the indication can dynamically change based on a change in the second distance value. For instance, in some examples, a color of the indication displayed on the first display screen can be based on the second distance value. In other words, a color of the indication may change if the second distance value changes (i.e. the second electronic device 104 moves farther or closer with respect to the first electronic device 102). As an example, the color of the indication can change from 'Green' to 'Yellow' if the second distance value is within a first range and can further change from 'Yellow' to 'Red' if the second distance value is within a second range. In an example embodiment, the color of the indication may become 'Red' if the second electronic device 104 is in close proximity (e.g. at a distance less than 2 feet) to the first electronic device 102.

In some example embodiments, the alert can be generated on both of the first electronic device 102 and the second electronic device 104. Also, in some example embodiments, the alert generated by the processing unit 150 can include a combination of indications (e.g. ringing an alarm along with displaying indication on display screen), as described earlier.

According to another example embodiment, based on a comparison of the second distance value with a predefined threshold value, the processing unit 150 of the first electronic device 102 may cause generation of the alert on the second electronic device 104. As an example, the processing unit 150 may send a first command to the second electronic device 104 to ring an alarm on the second electronic device 104. In another example, the processing unit 150 may send a second command to the second electronic device 104 to display an indication on a second display screen of the second electronic device 104. In this regard, similar to as described previously for the first electronic device 104, a color of the indication on the second display screen can be based on the second distance value. In other words, the color of the indication on the second display screen of the second electronic device 104 can change according to a change in the second distance value. In another example, the processing unit 150 may send a third command to the second electronic device 104 to cause generation of a haptic feedback on the second electronic device 104. In another example, the processing unit 150 may send a fourth command to the second electronic device 104 to cause activation of a second flashlight of the second electronic device 104. The method stops at step 914.

According to some example embodiments described herein, an exchange of signals over ultrasound frequency range can be performed based on a condition i.e. when two electronic devices (102, 104) are within a BLE communication range of each other. In this aspect, as exchange of signals ultrasound frequency can be a resource intensive operation, halting or pausing execution of the exchange of signals at the ultrasound frequency, in some instances (e.g. in absence of another electronic device within the BLE communication range of the first electronic device 102) may facilitate in conserving resources (e.g. battery, processing time) of the electronic devices (102, 104).

FIG. 10 illustrates a flow chart representing a method 1000 for establishing a communication between the first electronic device 102 and the second electronic device 104 based on exchange of signals at ultrasound frequency range, in accordance with another example embodiment described herein. In this example embodiment, an exchange of signals at ultrasound frequency range between the two electronic devices (102, 104) can be initiated based on detecting if the two electronic devices (102, 104) are within a Bluetooth low energy (BLE) communication range of each other. In other words, transmission of signals at the ultrasound frequency range can be terminated or paused in such instances where the two electronic devices (102, 104) are not within the BLE communication range of each other.

The method 1000 starts at step 1002. At step 1004, the first electronic device 102 can include means such as, the processing unit 150 to cause, via the communications circuit 160, broadcasting of a connection request for a connection over the BLE communication network. For instance, the first electronic device 102 can advertise one or more BLE signals requesting other electronic devices to connect with the first electronic device 102, over the BLE communication network.

In response to broadcasting the connection request, the first electronic device 102 'may' or 'may not' receive a response to the connection request. For instance, a response to the connection request may be received at the first electronic device 102 from another electronic device (e.g. the second electronic device 104), if it is located within a BLE communication range of the first electronic device 102. Alternatively, no response to the connection request may be received at the first electronic device 102, if no other electronic device is available within the BLE communication range of the first electronic device 102.

As illustrated, at step 1006, the processing unit 150 can identify if a response to the connection request is received at the first electronic device 102. The method moves to step 1008 in response to receiving of the BLE response. However, if no BLE response is received, the method moves to step 1018, at which the processing unit 150 may terminate or pause initiating any exchange of signals at ultrasound frequency. In this regard, terminating the estimation of distance may also include not initiating a determination of a distance of the first electronic device 102 with nearby electronic devices (e.g. the second electronic device 104), thereby saving resources (e.g. battery, processing cycles etc.) of the first electronic device 102. Accordingly, in some examples, if no other electronic device within the BLE communication range of the first electronic device 102 is identified by the processing unit 150, the first speaker (152, 204) may not initiate transmission of any signal at ultrasound frequency range and the first microphone (154, 202) may not identify any signal at ultrasound frequency range that may be received at the first electronic device 102.

Moving to step 1008, in response to affirmative identification of the BLE response received at step 1006, the first electronic device 102 may include means such as, the first microphone (154, 202) that can identify a signal at the ultrasound frequency. As an example, the signal may be received at the first electronic device 102 from the second electronic device 104 or any other electronic device within BLE communication range of the first electronic device 102.

Further, at step 1010, the first electronic device 102 can include means such as, the communications circuit 154 that can receive timing information corresponding to an exchange of ultrasound transmission between the first electronic device 102 and the second electronic device 104. As described earlier in reference to FIGS. 1-9, the exchange of ultrasound transmission corresponds to exchange of signals at ultrasound frequency between the first electronic device 102 and the second electronic device 104. For example, as described in reference to FIGS. 2 and 3, the timing information can include data values of timings at which: (a) the first signal 214 is transmitted by the first electronic device 102, (b) the first signal is received at the second electronic device 104, (c) the second signal 216 is transmitted by the second electronic device 104, and (d) the second signal 216 is received at the first electronic device 102. In an example embodiment, the timing information can be received at the first electronic device 102 from the computing platform 105 (e.g. a server). In another example embodiment, the timing information can be shared between the two electronic devices (102, 104) respectively. In other words, the first electronic device 102 may receive from the second electronic device 104, information corresponding to sending and receiving of the signals at the second electronic device 104.

Further, at step 1012, the processing unit 150 can compute a first distance value between the first electronic device 102 and the second electronic device 104. The first distance value can be computed by using the timing information and performing a time of flight estimation, in a similar manner, as described earlier in reference to FIG. 9. Moving to step 1014, the first electronic device 102 can include means such as, the processing unit 150 to refine the first distance value. In this regard, the first value can be refined to a second distance value. In an example embodiment, the processing unit 150 can refine the first distance value to determine a second distance value. Refining the first distance value may include by modifying the first distance value based on a distance correction factor. In this regard, the distance correction factor can be an output from a machine learning model (e.g. the machine learning model 402 as described in reference to FIG. 4).

In accordance with some example embodiments, as described earlier in reference to FIG. 4, the machine learning model used for refining the first distance value can be defined by using an artificial neural network (ANN) architecture which can use (a) an input data, (b) perform regression analysis by processing the input data through a set of network layers, and (c) output the distance correction factor. In this aspect, according to some example embodiments, the input data can include: (a) the first distance value and (b) a set of distance values. The set of distance values can correspond to sample data set of distance values that can be recorded according to at least one predefined factor by keeping the two electronic devices (102, 104) at known positions. As described earlier in reference to FIG. 9, the at least one predefined factor can correspond to a factor that affects the time of flight based estimation of distance between two electronic devices (102, 104). For example, the at least one predefined factor can include: (i) a temperature of a work environment in which the first electronic device 102 and/or the second electronic device may be located, (ii) a usage history of at least one of, the first electronic device 102 and the second electronic device 104, (iii) an orientation data associated with at least one of, the first electronic device 102 and the second electronic device 104, (iv) a device specification information associated with at least one of, the first electronic device 102 and the second electronic device (104), and (v) a state of movement associated with at least one of, the first electronic device 102 and the second electronic device 104.

At step 1016, the first electronic device 102 may include means such as, the processing unit 150 to generate an alert based on a comparison of the second distance value with a predefined threshold value. In some examples, the pre-defined threshold value can be a distance value that may be defined according to a physical distancing norm for an environment. For example, to avoid spread of a respiratory illness in a pandemic situation, it may be defined to maintain a physical distance of at least 6 feet apart between two workers in a work environment. Accordingly, the pre-defined threshold distance may be defined in accordance with a safety protocol or a safety regulation in a work environment that may set by an authority (e.g., but not limited to, health organization, state authority, industrial standard operating procedures, any distancing rule, etc.).

According to some example embodiments, the alert generated at step 1016 can be indicative of a safety concern (e.g. a possible violation of a safety norm) to be followed in an environment (e.g. work environment). In an example embodiment, the alert can be generated on the first electronic device 102. In another example embodiment, the alert can be generated on the second electronic device 104. In yet another example embodiment, the alert can be generated on both of the first electronic device 102 and the second electronic device 104. According to various example embodiments, the alert can be in form of, for example, but not limited to, ringing an alarm, displaying a color-based indication, generating a haptic feedback, activating a flashlight, on the electronic devices (102, 104). The method stops at step 1020.

As described earlier, in accordance with various example embodiments described herein, alerts indicative of a violation of physical distancing norm can be generated on electronic devices (e.g. mobile phones) that are used by users in an environment. In this regard, as described before, an alert may be generated, in response to determining, if a distance between two electronic devices (102, 104) used by the users is within a range of pre-defined threshold distance. According to some example embodiments, the pre-defined threshold distance that is to be considered for generating the alert can be dynamically changed based on a symptomatic state associated with users using the electronic devices (102, 104). As an example, if in usual operation, a threshold distance to be used for generating an alert is 6 feet (i.e. alert to be generated when a distance between two workers is less than 6 feet), in certain scenarios, the threshold distance can be 10 feet or more. In this regard, in accordance with said example embodiments, the threshold distance can be dynamically changed based on identifying that a user is symptomatic for respiratory illness (e.g. the user coughs, sneezes, heavily breathes, shortness of breathing etc.). Accordingly, the alert can be generated based on a new threshold distance. In this aspect, the new threshold distance can be determined based on a category of symptom of the user.

FIG. 11 illustrates a flow diagram representing a method 1100 for alerting a user of an electronic device (102, 104) according to a symptomatic state of another user, in accordance with an example embodiment described herein. According to an example, the method 1100 may be practiced in a work environment (e.g. an industrial environment, a warehouse, a distribution center etc.) where the first electronic device 102 may be used by a first worker and the second electronic device 104 may be used by a second worker working in the work environment.

The method starts at step 1102. At step 1104, the first electronic device 102 may include means such as, the first microphone (154, 202) that can identify a plurality of signals received at the first electronic device 102. Further, the plurality of signals may be received at the first electronic device 102 from the second electronic device 104, via the communication network 103. According to some examples, the plurality of signals may include, for example, but not limited to, (a) signals generated at ultrasound frequency by the second speaker 208 of the second electronic device 104 and/or (b) any other signal, for instance, a signal corresponding to any sound (e.g. sound of coughing, heavy breathing, sneezing, shortness of breathing, etc.) that may have been detected by the second microphone 206 of the second electronic device 104.

Moving to step 1106, the processing unit 150 of the first electronic device 102 may compute a first distance between the first electronic device 102 and the second electronic device 104. As described earlier in reference to FIGS. 1-10, the first distance can be computed, by performing a time of flight estimation by using a timing information related to exchange of signals at ultrasound frequency between the first electronic device 102 and the second electronic device 104, respectively.

According to some example embodiments, the processing unit 150 may remove signal noise (e.g. signals pertaining to environmental noise) from amongst the plurality of the signals received at the electronic devices (102, 104). In this regard, according to some example embodiments, the plurality of signals received at the electronic devices (102, 104) can comprise of, ultrasound frequency signals and other signals pertaining to environmental noise. In some example embodiments, the processing unit 150 may perform signal processing to identify signals generated by the second speaker 208 at ultrasound frequency which are received at the first electronic device 104. According to some example embodiments, the processing unit 150 may use any digital signal processing technique to filter out signals corresponding to the ultrasound frequency from amongst the plurality of signals. Alternatively, in some example embodiments, the processing unit 150 may utilize a machine learning model that can be employed by the machine learning engine 402 to filter out signal noise and further classify, from amongst the plurality of signals received at the first electronic device 102, a set of signals corresponding to the ultrasound frequency. In this regard, in some example embodiments, the processing unit 150 can use signal filters in time domain to detect signals pertaining to the environmental noise, in some cases, where the environmental noise signals are not overlapping with ultrasound frequency signals in time domain.

For other cases i.e. where the ultrasound frequency signals and signals corresponding to the environmental noise are recorded at a receiver (e.g. communications circuit 160) of the electronic devices (102, 104) at same time (i.e. signals are overlapping), signal filters may not be used. In such cases, the processing unit (150, 170) can use the machine learning engine 402 to employ a pattern detection convolutional neural network to detect the set of signals corresponding to ultrasound signal accurately from amongst the plurality of signals received at the electronic devices (102, 104). In this regard, the machine learning model can be trained with multiple noise and ultrasound signals combination to mark out the set of signals actually corresponding to ultrasound frequency. The machine learning model employed by the machine learning engine 402 can use supervised learning to detect the set of signals at ultrasound frequency and/or filter out signals pertaining to the environment noise from the plurality of signals received at the electronic devices (102, 104). Accordingly, the timing information corresponding to exchange of the set of signals pertaining to the ultrasound frequency can be used to determine the first distance value.

At step 1108, the processing unit 150 of the first electronic device can refine the first distance. In an example embodiment, the first distance value can be refined to determine a second distance value. As described in reference to FIGS. 1-10 earlier, the processing unit 150 can refine the first distance by using a machine learning model. In some examples, the machine learning model can be employed by the machine learning engine 402 and based on the architecture 400, as described in reference to FIG. 4. In this regard, the processing unit 150 can refine the first distance by using an output of the machine learning model e.g. a distance correction factor. Accordingly, at step 1108, the processing unit 150 can determine the second distance value from the first distance value.

At step 1110, the processing unit 150 can identify a symptomatic state of the second worker using the second electronic device 104. According to some examples, the symptomatic state can be indicative of a state of illness of a worker. For instance, the symptomatic state can indicative if a worker is experiencing symptoms of illness (e.g. a respiratory illness). According to some example embodiments, the processing unit 150 can use a second machine learning model to identify the symptomatic state of the second worker. In this regard, the second machine learning model can process the plurality of signals to identify the symptomatic state of the second worker. In some example embodiments, the machine learning engine 402 can employ the second machine learning model. In some example embodiments, the second machine learning model can utilize supervised learning by using sample data such as, labelled data of known signals values indicating symptoms (e.g. coughing, sneezing, shortness of breath, heavy breathing etc.), as input to train the model by utilizing any machine learning technique (e.g. classification analysis). In some example embodiments, the machine learning engine 402 can use an audio signal classifier and employ a convolutions neural network (trained with labelled voice sample collected for various symptoms from multiple peoples) to detect, in real-time, the symptoms associated with the second worker. In this regard, in some example embodiments a first part of the CNN network can extract features (using convolutional layers) from voice samples of the second workers that may be recorded during the exchange of the ultrasound frequency signals and estimation of the first distance. Further, a second part of the CNN network can perform a non-linear transformation of the extracted voice features (using full connected layers) to classify one or more signals recorded during the exchange of ultrasound frequency signals, as either symptomatic (with one of the detected class) or asymptomatic.

At step 1112, the processing unit 150 can identify if the second worker is symptomatic or asymptomatic. In this regard, the processing unit 150 can make the identification based on identification of the symptomatic state of the second worker, as described at step 1110. According to some examples, the second worker can be in a symptomatic state if the worker performs any of, coughing, sneezing, heavy breathing, and/or the like, while performing an operation in a work environment. Accordingly, the second worker can be asymptomatic if the worker doesn't possess any of the stated respiratory symptoms. In case of an affirmative response that the second worker is symptomatic, the method moves to step 1116. Alternatively, in case of non-affirmative response at step 1112, the method 1100 moves to step 1114.

At step 1114, the processing unit 150 can generate an alert on the first electronic device 102 based on a comparison of the second distance value with a first predefined threshold value. The first predefined threshold value can correspond to a distance value that may be defined according to a physical distancing norm for an environment. As described earlier in reference to FIGS. 1-10, the alert can be generated on the first electronic device 102 or the second electronic device 104 or on both of the first electronic device 102 and the second electronic device 104 respectively. Further, as described before, the alert can be in form of, for example, but not limited to, ringing an alarm, displaying a color-based indication, generating a haptic feedback, activating a flashlight, on the electronic devices (102, 104). In some examples, the alert can also notify the first worker about the second distance, i.e. a distance at which the second worker is away from the first worker.

In response to affirmative identification of the second worker to be symptomatic at step 1112, the method 1100 moves to step 1116. At step 1116, the processing unit 150 can identify a category of the symptom of the second worker. There may be various categories of symptoms of illness associated with the second worker. Accordingly, the processing unit 150 can identify the category of the symptom experienced by the second worker. For instance, the processing unit 150 can identify the category of the symptom to be any of, 'pre-symptomatic, 'very-mild', 'mild', 'severe', 'serious', and 'very-serious'. In some examples, the category can be based on symptomatic state associated with the second worker, e.g., an intensity of the coughing, sneezing, and/or heavy breathing identified for the second worker. According to some example embodiments, the processing unit 150 can identify the category of the system based on an output classification of the second machine learning model.

Generally, in a work environment, to avoid spread of infectious viral, it may be desired to maintain at least a predefined distance between two workers. For example, it may be sufficient to maintain a distance of 6 feet between two workers, if none of the worker is symptomatic. Said that, if any of the worker is symptomatic then the predefined (e.g. 6 feet) distance between the two workers may not be sufficient to prevent viral transmission from the symptomatic worker to another. Accordingly, in accordance with some example embodiments described herein, the pre-defined distance may be dynamically revised according to symptomatic condition of workers in a work environment. Having said that, as illustrated at step 1118, the processing unit 150 can determine a second pre-determined threshold value based on the category of the symptom associated with the second worker. For example, if the first pre-defined threshold value is 6 feet, the second predefined threshold value can be 8 feet, 10 feet, 12 feet, 14 feet, 16 feet, and 18 feet, respectively, for each of 'pre-symptomatic, 'very-mild', 'mild', 'severe', 'serious', and 'very-serious' category of the symptomatic state associated with the second worker. Accordingly, the predefined distance (i.e. the threshold distance) used for generating the alerts can be dynamically changed according to the category of symptomatic state of the second worker.

At step 1120, the processing unit 150 can generate an alert based on comparison of the second distance value with the second pre-defined threshold value. As described earlier in reference to FIGS. 1-10, the alert can be generated on the first electronic device 102, the second electronic device 104, or on both the electronic devices (102, 104). According to various example embodiments, the alert can be generated in any manner on the first electronic device 102 and/or the second electronic device 104, as described previously in reference to description of FIGS. 1-10.

In accordance with some example embodiments, the processing unit 150 can generate the alert based on a category of the symptomatic state. For instance, in response to identification of 'severe', 'serious', or 'very-serious' symptomatic state of the second worker, the alert with a higher intensity may be generated. As an example, in response to identification of 'severe', 'serious', or 'very serious' symptomatic state of the second worker the alert can be generated for a longer duration. In another example, in response to identification of 'severe', 'serious', or 'very serious' symptomatic state of the worker, an alarm can be generated with at a higher volume compared to a usual volume of generating the alarm. In another example, the alert can be displayed on a display screen of the second electronic device 104 and indicate the second worker to move in an isolated section of the work environment. In some examples, the alert can be audio and/or visual and can also provide guidance for the second worker to use precautionary measures e.g. wear mask, cover the face, etc. Accordingly, different variations of alerting workers based on category of the symptomatic state can be possible. The method stops at step 1122.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A method comprising:
   identifying, by a first microphone of a first electronic device, a signal at an ultrasound transmission frequency which is received from a second electronic device;
   receiving, at the first electronic device, timing information corresponding to an exchange of an ultrasound transmission between the first electronic device and the second electronic device;
   computing, by a processing unit of the first electronic device, a first distance value between the first electronic device and the second electronic device by performing a time of flight estimation using the timing information;
   refining, by the processing unit, the first distance value by using an output of a machine learning model to determine a second distance value, wherein the machine learning model is based on input data comprising: the first distance value and a set of distance values that are each associated with at least one respective predefined factor that affects an estimation of distance between the first electronic device and the second electronic device; and
   generating, by the processing unit, an alert on the first electronic device based on a comparison of the second distance value with a predefined threshold distance value.

2. The method of claim 1, wherein the at least one predefined factor comprises: (i) a temperature of an environment in which at least one of the first electronic device and the second electronic device are present, (ii) usage history of at least one of the first electronic device and the second electronic device, (iii) orientation data associated with at least one of the first electronic device and the second electronic device, (iv) a device specification information associated with at least one of the first electronic device and the second electronic device, and (v) movement data associated with at least one of the first electronic device and the second electronic device.

3. The method of claim 1, wherein the alert is indicative of a violation of a physical distancing guideline that is to be maintained between a first worker associated with the first electronic device and a second worker associated with the second electronic device in an environment.

4. The method of claim 1, wherein generating the alert comprises at least one of:
   ringing an alarm on the first electronic device;
   displaying an indication on a first display screen of the first electronic device, wherein a color of the indication is based on the second distance value;
   generating a haptic feedback on the first electronic device; and
   activating a first flashlight of the first electronic device.

5. The method of claim 1, wherein generating the alert further comprises at least one of:
   sending, by the first electronic device, a first command to ring an alarm on the second electronic device;
   sending, by the first electronic device, a second command to display an indication on a second display screen of the second electronic device, wherein a color of the indication is based on the second distance value;
   sending, by the first electronic device, a third command to generate a haptic feedback on the second electronic device; and
   sending, by the first electronic device, a fourth command to activate a second flashlight of the second electronic device.

6. The method of claim 1 comprising:
   broadcasting, by a first communication circuit of the first electronic device, a request for connection over a Bluetooth low energy (BLE) communication network; and
   in response to receiving of a response to the request for connection from the second electronic device, generating a first signal at a first ultrasound frequency by the first electronic device.

7. The method of claim 1 wherein the machine learning model is based on artificial neural network, wherein the input data is transformed an output indicative of a distance correction factor by performing regression on the input data and wherein the second distance value is determined by modifying the first distance value using the distance correction factor.

8. A system comprising:
a processor; and
a memory that stores executable instructions that, when executed by the processor, facilitate performance of operations, comprising:
receiving a timing information corresponding to an exchange of an ultrasound frequency signal by a first electronic device and a second electronic device;
computing a first distance value between the first electronic device and the second electronic device by performing a time of flight estimation using the timing information;
refining the first distance value by using an output of a machine learning model to determine a second distance value, wherein the machine learning model is based on input data comprising: the first distance value and a set of distance values that are recorded according to at least one predefined factor that affect an estimation of distance between the first electronic device and the second electronic device; and
generating an alert on at least one of, the first electronic device and the second electronic device, based on a comparison of the second distance value with a predefined threshold distance value.

9. The system of claim 8, wherein the at least one predefined factor comprises: a temperature of a work environment, a usage history of at least one of the first electronic device and the second electronic device, an orientation data associated with at least one of the first electronic device and the second electronic device, a device specification information associated with at least one of the first electronic device and the second electronic device, and a state of movement associated with at least one of the first electronic device and the second electronic device.

10. The system of claim 8, wherein the alert is indicative of a violation of a physical distancing norm that is to be maintained between a first worker associated with the first electronic device and a second worker associated with the second electronic device in an environment.

11. The system of claim 8, wherein the operations further comprise:
generating a first command to cause ringing of an alarm on at least one of the first electronic device and the second electronic device;
generating a second command to cause displaying of an indication on at least one of, a first display screen of the first electronic device and a second display screen of the second electronic device, wherein a color of the indication is based on the second distance value;
generating a third command to cause activation of at least one of, a first flashlight of the first electronic device and a second flashlight of the second electronic device; and
generating a fourth command to cause generating of a haptic feedback on at least one of, the first electronic device and the second electronic device.

12. The system of claim 8, wherein the operations further comprise:
receiving, from the first electronic device, (a) a first timing information indicative timing of broadcasting of a first signal at a first ultrasound frequency by a first speaker of the first electronic device and (b) a second timing information indicative of timing of receiving of a second signal at a second ultrasound frequency by a first microphone of the first electronic device;
receiving, from the second electronic device, (c) a third timing information indicative timing of broadcasting of the second signal at the second ultrasound frequency by a second speaker of the second electronic device and (d) a fourth timing information indicative of timing of receiving of the first signal at the second ultrasound frequency by a second microphone of the second electronic device; and
computing the first distance between the first electronic device and the second electronic device by performing the time of flight estimation based on the first timing information, the second timing information, the third timing information, and the fourth timing information.

13. The system of claim 8, further comprising a machine learning engine communicatively coupled to the processor and configured to:
employ the machine learning model based on an artificial neural network;
transform the input data by performing a regression to output a classification indicative of a distance correction factor; and
modify the first distance value using the distance correction factor.

14. A first electronic device comprising:
a speaker configured to generate a first signal at a predefined ultrasound frequency;
a microphone configured to identify a second signal at the predefined ultrasound frequency;
a communication circuitry configured to: transmit the first signal and receive the second signal; and
a processing unit communicatively coupled to the speaker, the microphone, and the communication circuitry, wherein the processing unit is configured to:
receive timing information corresponding to an exchange of an ultrasound transmission between the first electronic device and a second electronic device;
compute a first distance value between the first electronic device and the second electronic device by performing a time of flight estimation using the timing information;
refine the first distance value by using an output of a machine learning model to determine a second distance value, wherein the machine learning model is based on input data comprising: the first distance value and a set of distance values that are each associated with at least one respective predefined factor that affects an estimation of distance between the first electronic device and the second electronic device; and
generate an alert on the first electronic device based on a comparison of the second distance value with a predefined threshold distance value.

15. The first electronic device of claim 14, wherein the alert is indicative of a violation of a physical distancing norm that is to be maintained between a first worker associated with the first electronic device and a second worker associated with the second electronic device in an environment.

16. The first electronic device of claim 14, wherein the at least one predefined factor comprises: a temperature of a work environment, a usage history of at least one of the first electronic device and the second electronic device, an orientation data associated with at least one of the first electronic device and the second electronic device, a device specification information associated with at least one of the first electronic device and the second electronic device, and a state of movement associated with at least one of the first electronic device and the second electronic device.

17. The first electronic device of claim 14, wherein the processing unit is configured to generate the alert that comprises at least one of:
ringing an alarm on the first electronic device;
displaying an indication on a first display screen of the first electronic device,
wherein a color of the indication is based on the second distance value;
generating a haptic feedback on the first electronic device; and
activating a first flashlight of the first electronic device.

18. The first electronic device of claim 14, wherein the communication circuitry is configured to broadcast a request for connection over a Bluetooth low energy (BLE) communication network and wherein, in response to receiving of a response to the request for connection from the second electronic device, the processing unit is configured to initiate transmission of the first signal.

19. The first electronic device of claim 14, wherein the processing unit is configured to further:
send a first command to ring an alarm on the second electronic device;
send a second command to display an indication on a second display screen of the second electronic device, wherein a color of the indication is based on the second distance value;
send a third command to generate a haptic feedback on the second electronic device; and
send a fourth command to activate a second flashlight of the second electronic device.

20. The first electronic device of claim 14, further comprising a machine learning engine communicatively coupled to the processing unit, wherein the machine learning engine is configured to:
employ the machine learning model based on artificial neural network;
transform the input data by performing a regression to output a classification indicative of a distance correction factor; and
modify the first distance value using the distance correction factor.

* * * * *